United States Patent
Wentink et al.

(10) Patent No.: US 11,968,714 B2
(45) Date of Patent: Apr. 23, 2024

(54) CLEAR CHANNEL ASSESSMENT (CCA) ENABLED NARROWBAND (NB) COMMUNICATIONS

(71) Applicant: QUALCOMM Incorporated, San Diego, CA (US)

(72) Inventors: Maarten Menzo Wentink, Nijmegen (NL); Marco Papaleo, Bologna (IT); Robin Heydon, Cambridge (GB); Magnus Sigverth Sommansson, Veberod (SE)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 17/406,864

(22) Filed: Aug. 19, 2021

(65) Prior Publication Data
US 2023/0056736 A1   Feb. 23, 2023

(51) Int. Cl.
*H04W 74/08*       (2009.01)
*H04L 5/00*        (2006.01)
*H04W 4/80*        (2018.01)
*H04W 74/0816*     (2024.01)
*H04W 84/12*       (2009.01)

(52) U.S. Cl.
CPC ....... *H04W 74/0816* (2013.01); *H04L 5/0012* (2013.01); *H04W 4/80* (2018.02); *H04W 84/12* (2013.01)

(58) Field of Classification Search
CPC ... H04W 74/0816; H04W 4/80; H04W 84/12; H04W 74/0808; H04L 5/0012; H04L 5/0044; H04L 5/0078
See application file for complete search history.

(56) References Cited

U.S. PATENT DOCUMENTS

| | | | | |
|---|---|---|---|---|
| 2010/0291921 A1* | 11/2010 | Ruuska | ................. | H04W 24/00 455/426.1 |
| 2016/0119792 A1* | 4/2016 | Cheng | ................... | H04W 16/14 455/454 |
| 2021/0120555 A1* | 4/2021 | Badic | .................... | H04W 72/12 |

* cited by examiner

*Primary Examiner* — Steven Hieu D Nguyen
(74) *Attorney, Agent, or Firm* — Holland & Hart LLP

(57) ABSTRACT

This disclosure provides systems, methods and apparatus for clear channel assessment (CCA) enabled narrowband (NB) communications. In some implementations, a device is configured to associate with an NB channel (such as a Bluetooth channel), perform a CCA to assess whether the NB channel is clear, and transmit on the NB channel when clear. If the NB channel is not clear, the device may prevent transmitting on the NB channel. The device may prevent avoiding the NB channel after the first time that the NB channel is not clear. If the NB channel remains not clear (such as over a number of CCAs for the NB channel), the device may avoid the NB channel by removing the NB channel for FH for an amount of time. In some implementations, the device may be configured to perform frame based equipment (FBE) CCAs for one or more NB channels.

24 Claims, 13 Drawing Sheets

1800 ↘

1802

Assess that the first NB channel is not clear, wherein the first amount of time is to occur after the assessment that the first NB channel is not clear.

Move from the first frequency segment to a second frequency segment of the frequency spectrum after identifying that the at least y number of CCAs causes the wireless communication device to assess that at least one of the one or more NB channels is not clear.

Perform FH among a second plurality of NB channels in the second frequency segment during the second amount of time.

Figure 20

CLEAR CHANNEL ASSESSMENT (CCA) ENABLED NARROWBAND (NB) COMMUNICATIONS

TECHNICAL FIELD

This disclosure relates generally to wireless communication, and more specifically, to using clear channel assessments to prevent interference for narrowband communications.

DESCRIPTION OF THE RELATED TECHNOLOGY

A wireless local area network (WLAN), wireless personal area network (WPAN) or Internet of Things (IoT) network may be formed by a number of devices that share a wireless communication medium. One type of network may be an ad hoc network in which devices can communicate directly with one another via wireless links. For example, the network may be a Bluetooth® network and the devices may be Bluetooth®-compliant devices. A Bluetooth®-compliant device can be any device that implements one or more of the Bluetooth® wireless communication protocols as defined by the IEEE 802.15 standards or the Bluetooth Special Interest Group (SIG) standards, for example, including the Bluetooth 4.0 Specification and the Bluetooth 5.0 Specification. Bluetooth® refers to a set of short-range wireless communication protocols including the Basic Rate (BR) core configuration, the Enhanced Data Rate (EDR) configuration, and the Low Energy (LE) core configuration as, for example, defined in Bluetooth SIG Specification Versions 4.0 and 5.0. Both the BR physical layer (PHY) and the LE PHY operate in the unlicensed Industrial, Scientific and Medical (ISM) 2.4 GHz short-range radio frequency band (2400-2483.5 MHz). Bluetooth-compliant devices may transmit and receive wireless packets to and from one another according to a master/slave architecture. Additionally or alternatively, Bluetooth-compliant devices may transmit and receive Bluetooth packets according to a broadcaster/scanner architecture.

Another type of network, a WLAN, may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless communication device for narrowband (NB) communications. The wireless communication device includes a processing system and an interface. The processing system is configured to perform a clear channel assessment (CCA) to assess whether a first NB channel is clear. The interface is configured to associate with a first NB channel and transmit on the first NB channel when the first NB channel is clear.

In some implementations, NB communications include Bluetooth® (BT) communications, and the first NB channel is a first BT channel. In some implementations, a first frequency spectrum includes the first BT channel, the first frequency spectrum being used for wideband (WB) communications. In some implementations, WB communications include wireless local area network (WLAN) communications.

In some implementations, access to an NB channel of one or more NB channels for transmission is during defined time frames, the one or more NB channels including the first NB channel; transmission by the wireless communication device on the first NB channel is to occur during a first time frame of the defined time frames; and the CCA to assess whether the first NB channel is clear occurs at a beginning of the first time frame.

Another innovative aspect of the subject matter described in this disclosure can be implemented in a method for NB communications. The method includes associating with a first NB channel, performing a CCA to assess whether the first NB channel is clear, and transmitting on the first NB channel when the first NB channel is clear.

In some implementations, NB communications include BT communications, and the first NB channel is a first BT channel. In some implementations, a first frequency spectrum includes the first BT channel, the first frequency spectrum being used for WB communications. In some implementations, WB communications include WLAN communications.

In some implementations, access to an NB channel of one or more NB channels for transmission is during defined time frames, the one or more NB channels including the first NB channel; transmission by the wireless communication device on the first NB channel is to occur during a first time frame of the defined time frames; and the CCA to assess whether the first NB channel is clear occurs at a beginning of the first time frame.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 18 shows a flowchart illustrating an example process for identifying a number of CCAs after identifying a first NB channel as not clear.

FIG. 19 shows a flowchart illustrating another example process for moving from a first frequency segment to a second frequency segment for NB communications.

FIG. 20 shows a flowchart illustrating another example process for performing FH after moving from the first frequency segment.

Like reference numbers and designations in the various drawings indicate like elements.

DETAILED DESCRIPTION

Figure 1:
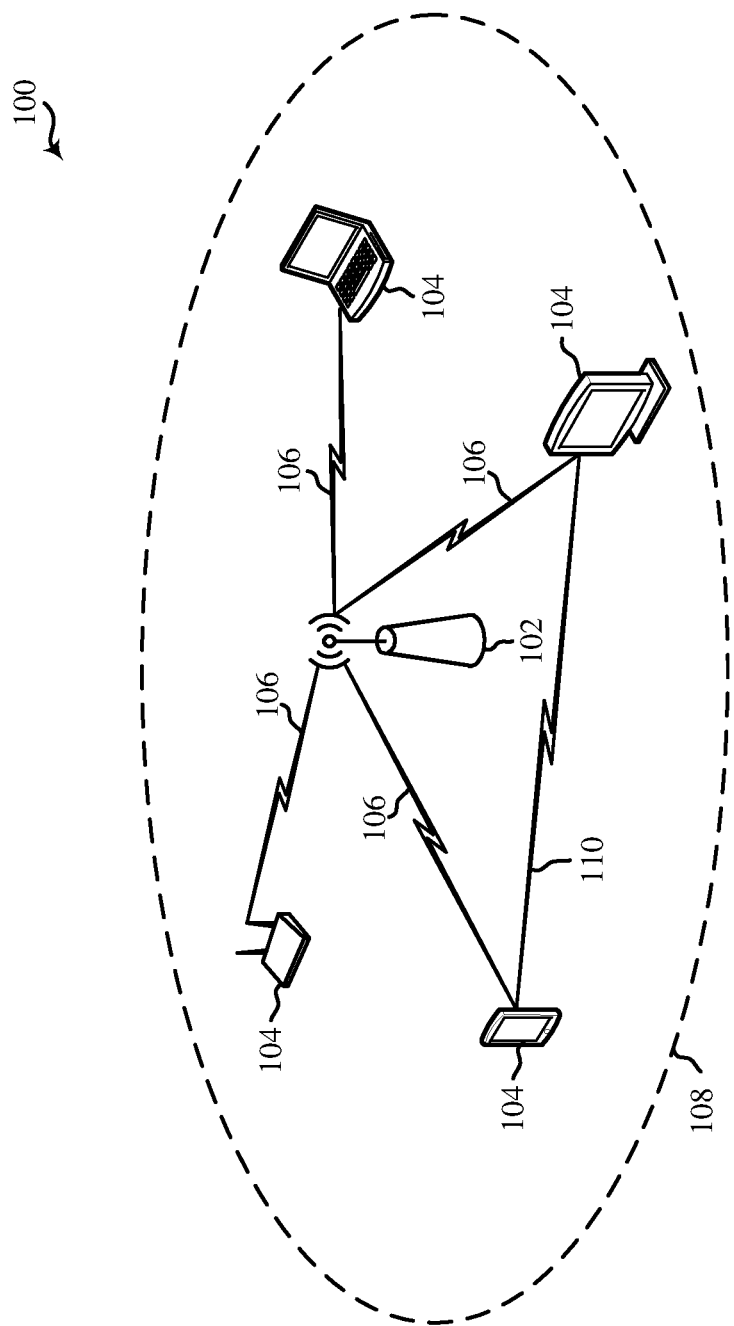
FIG. 1 shows a diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), the European Telecommunications Standards Institute (ETSI) standards, or other standards for defining communications via RF signals. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), or an internet of things (IOT) network.

A wireless medium may be used for wireless communications. Wireless communications can include one or more narrowband (NB) communications or wideband (WB) communications. WB communications refers to wireless communications on one or more WB channels. A WB channel may refer to a channel greater than, for example, 10 Megahertz (MHz) or 20 MHz. For example, the IEEE 802.11 standards define channels for a wireless local area network (WLAN) to be equal to or greater than 20 MHz. In this manner, WLAN communications are an example of WB communications. Long Term Evolution (LTE) communications or some other cellular communications as defined by the Third Generation Partnership Project (3GPP) standards are another example of WB communications. ETSI European Standard (EN) 301 893 and ETSI EN 303 687 similarly define WB communications and operation in the 5 GHz and 6 GHz bands, respectively, with a minimum channel width of 20 MHz. NB communications refers to wireless communications on one or more NB channels. An NB channel may refer to a channel smaller than, for example, 10 MHz or 20 MHz. For example, the Bluetooth (BT) standards define example channels for BT communications to be 1 MHz in size. In this manner, BT communications are an example of NB communications. The ETSI set of standards (such as ETSI EN 300 328 defining communications in the 2.4 GHz frequency spectrum) define another example of NB communications. As used herein, NB communications refers to wireless communications for which frequency hopping (FH) is applied. For example, a device configured for BT communications frequency hops among a plurality of BT channels for NB communications. As used herein, an NB channel is a wireless channel for which FH is applied.

An NB transmission may interfere with a coinciding NB transmission on the wireless medium. The NB transmission also may interfere with a coinciding WB transmission for WB communications. Interference may prevent a receiving device from receiving a transmission or correctly decoding the transmission, causing errors in NB communications or WB communications. Devices for WLAN communications use a clear channel assessment (CCA) mechanism to prevent interference on the wireless medium by ensuring a WLAN channel is clear before transmitting on the WLAN channel. For example, the IEEE 802.11 standards define a CCA over 20 MHz channels. The ETSI set of standards (such as ETSI EN 301 893 and ETSI EN 303 687) similarly define a CCA over 20 MHz channels. Devices for BT communications use a detect and avoid (DAA) mechanism to prevent interference by avoiding a BT channel for an amount of time if the BT channel is busy while occupying the BT channel. The DAA mechanism generally is configured for interference caused by WLAN communications or other WB communications on a WB channel whose frequency covers the frequency of the BT channel. In this manner, the device vacates the BT channel (such as by excluding the BT channel from FH for an amount of time) to prevent interfering with the WB communications. Interference when the device (configured to perform DAA) first occupies the BT channel may cause latency for a device accessing an overlapping WLAN channel for WLAN communications (such as requiring retransmission as a result of interference from the BT communication). Alternatively, a BT channel may include interference by another BT transmission instead of a WLAN transmission on an overlapping WLAN channel. Multiple devices attempting to access the same NB channel for transmission (such as multiple devices attempting to access the same BT channel for transmission) may cause latencies and lower throughput if DAA is exclusively used to prevent interference. In addition, a device may avoid an NB channel for longer than necessary if the interference is caused by another NB transmission instead of a WLAN transmission. For example, a BT transmission on a BT channel may end earlier than a WLAN transmission on a WLAN channel overlapping the BT channel. However, the DAA mechanism may cause a device to vacate the BT channel for longer than needed as a result of the BT channel being occupied regardless of whether the BT channel includes a BT transmission or a coinciding WLAN transmission. A CCA mechanism, under which a transmission on a wireless channel is not performed unless the wireless channel is clear, prevents multiple wireless transmissions on a same wireless frequency at the same time. In general, though, NB communication devices (such as BT communication devices) are not configured to perform a CCA to assess whether an NB channel is clear.

Various implementations relate generally to a device configured to perform a CCA for NB communications. Some implementations more specifically relate to a device associating with an NB channel (such as a BT channel), performing a CCA to assess whether the NB channel is clear, and transmitting on the NB channel when the NB channel is clear. If the NB channel is not clear, the device does not transmit on the NB channel, but the device does not avoid the NB channel (such as would be done via the DAA mechanism) after the first time that the NB channel is not clear. In this manner, if the schedule for hopping among NB channels for FH includes hopping back to the NB channel, the device hops back to the NB channel. In some implementations, if the NB channel continues to not be clear (such as over a number of CCAs for the NB channel), then the device may remove the NB channel for FH for an amount of time (such as similar to the DAA mechanism being used to avoid an NB channel). In some implementations, a listen before talk (LBT) mechanism is combined with DAA to prevent interference and reduced latency caused by employing DAA alone. A device may perform a CCA before every NB transmission. The device also is configured to avoid a frequency segment (such as a 20 MHz frequency segment) based on DAA triggers only if two or more CCAs in the frequency segment indicate that the frequency segment is busy within a given amount of time. If a requisite number of CCAs in the frequency segment indicates that the frequency segment is busy, the device disables using the frequency segment according to the DAA mechanism. In some implementations, the time between a CCA and a transmission after the CCA may be extended relative to the timing between CCAs and transmissions for existing WB implementations. In some implementations, several CCAs on different NB channels may be used to discern NB interference from WB interference. Various implementations of a CCA mechanism for NB communications, including aspects of a DAA mechanism being included with the CCA mechanism, are described herein.

Particular implementations of the subject matter described in this disclosure can be implemented to realize one or more of the following potential advantages. In some implementations, the described techniques of enabling CCA for NB communications may be used to prevent NB communications (such as BT communications) from interfering with WB communications (such as WLAN communications). In this manner, delays caused by interference for WB communications may be reduced and throughput for WB communications may be increased. In some implementations, the described techniques of enabling CCA for NB communications may be used to prevent NB communications from interfering with one another. As such, delays caused by interference for NB communications also may be reduced and throughput for NB communications also may be increased. In some implementations, the described techniques of enabling CCA for NB communications may be used to prevent avoiding an NB channel when not necessary (such as for two BT communication devices attempting to occupy a BT channel at the same time). A device may not avoid an NB channel (such as a BT channel) unless the interference is caused a WB communication (such as a WLAN communication), which may be ascertained, identified or determined based on a number of CCAs for the NB channel indicating that the NB channels remains not clear. In this manner, more NB channels may be available for FH, and more NB channels being available for FH may increase the throughput for NB communications (such as not needing to adjust an FH schedule as often to avoid more NB channels as a result of the DAA mechanism).

FIG. 1 shows a diagram of an example wireless communication network 100. According to some aspects, the wireless communication network 100 can be an example of a wireless communication network for WB communications. The wireless communication network 100 may be a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or CCC20 MHz by bonding together multiple 20 MHz channels. Such channels may be referred to herein as WLAN channels, which are example WB channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Access to a shared wireless medium may be governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and then contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. A CCA also may be referred to as listen before talk (LBT). The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the relevant threshold.

As described herein, the DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be).

When the NAV reaches 0, the wireless communication device performs the physical carrier sensing. If the channel remains idle for the appropriate IFS (for example, the DIFS), the wireless communication device initiates a backoff timer, which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication devices generates a new PPDU for transmission in a new TXOP, it randomly selects a new backoff timer duration. The available distribution of the numbers that may be randomly selected for the backoff timer is referred to as the contention window (CW). If, when the backoff timer expires, the wireless communication device transmits the PPDU, but the medium is still busy, there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may then increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, then proceed to initiate the new backoff timer. There are different CW and TXOP durations for each of the four access categories (ACs): voice (AC_VO), video (AC_VI), background (AC_BK), and best effort (AC_BE). This enables particular types of traffic to be prioritized in the network.

Figure 2:
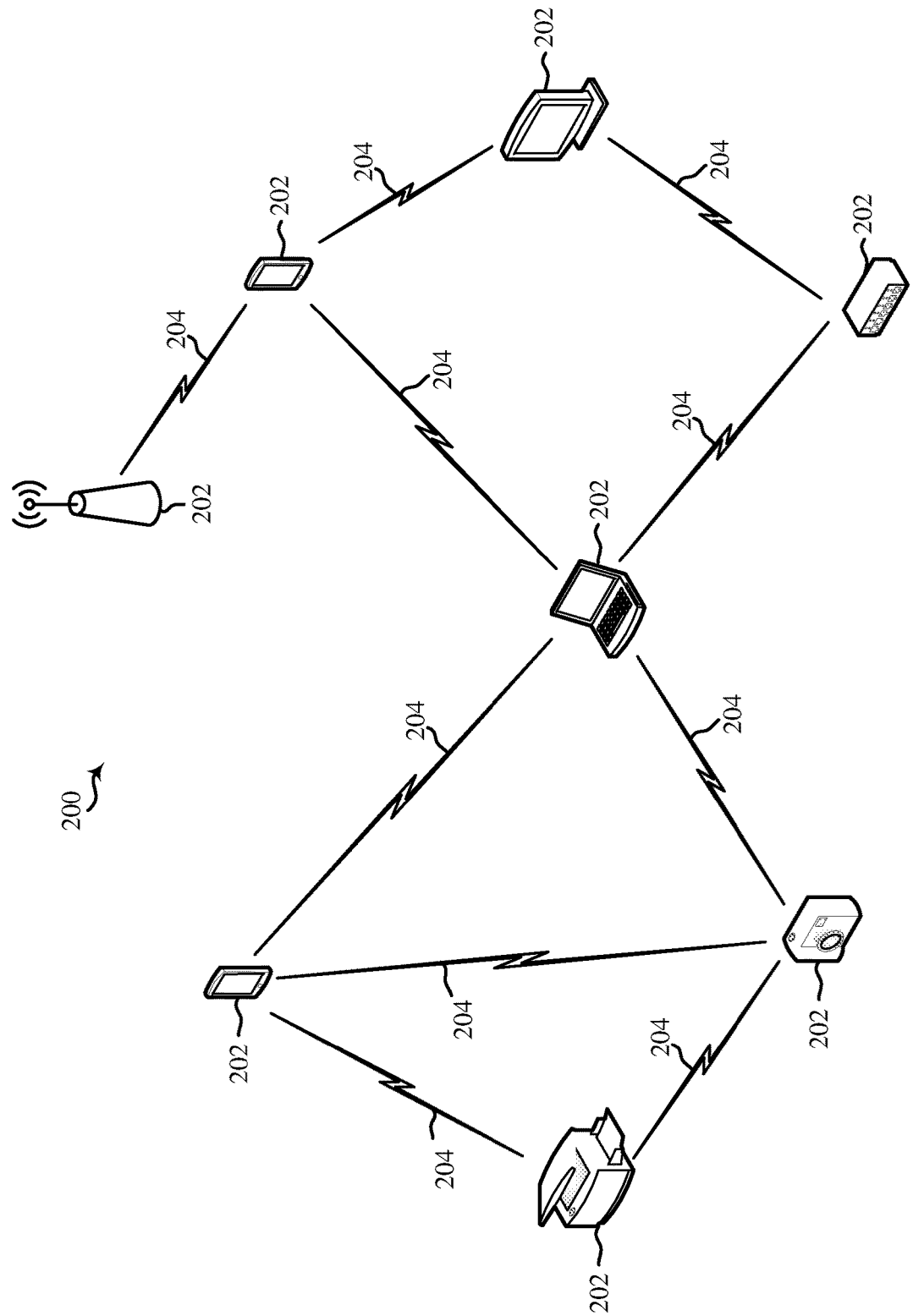
FIG. 2 shows a diagram of another example wireless communication network.

FIG. 2 shows a diagram of another example wireless communication network 200. In various implementations, the wireless communication network 100 can be an example wireless personal area network (PAN). The wireless communication network (hereinafter "wireless network") 200 may include multiple wireless communication devices including stations (STAs) 202. Each of the STAs 202 also may be referred to as a MS, a mobile device, a mobile handset, a wireless handset, an AT, a UE, a SS, or a subscriber unit, among other possibilities. The STAs 202 may represent various devices such as mobile phones, PDAs, other handheld devices, netbooks, notebook computers, tablet computers, laptops, display devices (for example, TVs, computer monitors, navigation systems, among others), music or other audio or stereo devices (for example, audio headphones or ear buds), remotes, printers, copiers, kitchen or other household appliances, key fobs (for example, for PKES systems), among other examples.

The wireless network 200 is an example of an ad hoc network. The STAs 202 can communicate directly with one another via wireless links 204. In some implementations, the wireless network 200 is an example of a Bluetooth® (hereinafter "Bluetooth" or "BT") network and the STAs 202 are Bluetooth-compliant devices (also referred to as "Bluetooth devices" or "BT devices"). A Bluetooth device can be any device, such as a Bluetooth-compliant STA 202, that implements one or more of the Bluetooth wireless communication protocols as defined by the IEEE 802.15 standards, the Bluetooth Special Interest Group (SIG) standards (for example, including the Bluetooth 4.0 Specification and the Bluetooth 5.0 Specification), or the ETSI standards. Bluetooth refers to a set of short-range wireless communication protocols including the Basic Rate (BR) core configuration, the Enhanced Data Rate (EDR) configuration, and the Low Energy (LE) core configuration as, for example, defined in Bluetooth SIG Specification Versions 4.0 and 5.0. The BR, EDR and LE physical layers (PHYs) operate in the unlicensed Industrial, Scientific and Medical (ISM) 2.4 GHz short-range radio frequency band (2400-2483.5 MHz) and may utilize frequency-hopping spread spectrum radio technology.

Bluetooth-compliant STAs 202 (hereinafter "STAs 202") may transmit and receive Bluetooth communications (for example, in the form of Bluetooth packets) to and from one another over wireless links 204 (hereinafter also referred to as "Bluetooth links") according to a master/slave architecture. Additionally or alternatively, STAs 202 may transmit and receive Bluetooth packets according to a broadcaster/scanner architecture. In the master/slave architecture, one of the STAs 202, referred to as the master, provides clock synchronization to the other STAs 202, which are referred to as slaves. During typical operation, a physical radio channel can be shared by multiple STAs 202 (referred to as a "piconet"). The STAs 202 of a Bluetooth piconet are synchronized to the common clock and frequency (channel) hopping pattern specified by the master. A master STA 202 may have wireless links with multiple slave STAs 202 simultaneously. Similarly, a slave STA 202 may be permitted to have wireless links to more than one master STA 202 at a time. Additionally, a STA 202 may be permitted to have the role of both master and slave at the same time; for example, a STA 202 may be a master as it pertains to a first wireless link with another STA 202 while simultaneously being a slave as it pertains to a second wireless link with yet another STA 202.

According to the Bluetooth Specification, packets in the form of protocol data units (PDUs) may be communicated via a logical link control and adaptation protocol (L2CAP) channel, which is layered over logical links and logical transports, which are in turn constructed on physical links, physical channels and physical transports. The BR logical transports include the Synchronous Connection-Oriented (SCO), extended SCO (eSCO), Asynchronous Connection-Oriented (ACL), Active Slave Broadcast (ASB) and Connectionless Slave Broadcast (CSB) logical transports. Both the synchronous and the asynchronous logical transports may represent point-to-point links between a master STA 202 and a respective slave STA 202. The master STA 202 maintains the synchronous logical transports using reserved time slots at regular intervals to transmit SCO and eSCO packets. The master STA 202 can establish an ACL logic transport on a per-slot basis to transmit ACL packets to any slave STA 202 in the time slots not reserved for SCO and eSCO packets.

The BR PHY supports a BR mode having a bit rate of 1 Mbps, and an EDR mode having a bit rate of 2 or 3 Mbps. Each BR packet (PDU) generally includes three portions: an access code, a header, and a payload (which may have zero length). The access code includes a preamble used for DC offset compensation, a sync word used for timing acquisition and synchronization, and optionally a trailer. The access code is also used for identification purposes as all packets transmitted in a single physical channel share the same access code. The packet header includes the link control information including a logical transport address and a packet type identification. In master-to-slave transmissions, the logical transport address indicates the destination slave STA 202 (or multiple slaves in the case of multicast or broadcast transmissions) intended to receive the packet, while in slave-to-master transmissions, the logical transport address indicates the source STA 202 transmitting the packet.

The Bluetooth LE core configuration is particularly designed to enable STAs 202 having relatively lower current consumption, complexity and cost than BR- or EDR-supporting STAs 202. For example, Bluetooth LE may be especially advantageous for use cases and applications requiring lower data rates and duty cycles. LE STAs 202 may support at least three PHY modes ("PHYs"): LE 1M, LE 2M and LE Coded, supporting bit rates of 1 megabit per second (Mbps), 2 Mbps, and either 125 kilobits per second (kpbs) or 500 kpbs (depending on the coding), respectively. LE supports both frequency division multiple access (FDMA) and time division multiple access (TDMA) schemes. Forty physical channels separated by 2 MHz may be used in the FDMA scheme. For TDMA, a polling scheme may be used in which one device transmits at a predetermined time and a corresponding device responds after a predetermined time interval. The LE logical transports include the LE asynchronous connection (LE ACL), LE Advertising Broadcast (ADVB) and LE Periodic Advertising Broadcast (PADVB) logical transports. The size of each BT channel is 1 MHz, which is an example NB channel. As noted herein, a BT channel is associated with FH onto and off of the BT channel by one or more BT devices. While the examples depict a BT channel or NB channel as 1 MHz, a BT channel or NB channel may be any suitable size, such as 2 MHz, 4 MHz, and so on.

Figure 3A:
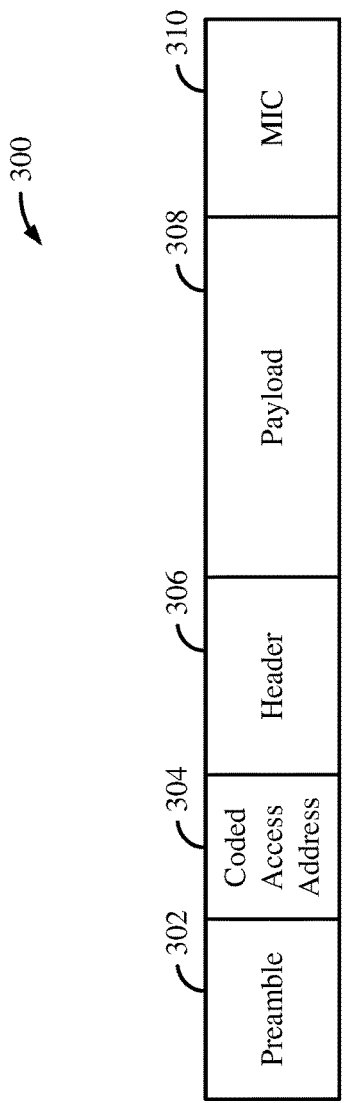
FIG. 3A shows an example protocol data unit (PDU) configured for transmission on one or more physical channels.

FIG. 3A shows an example PDU 300 configured for transmission on one or more Bluetooth LE physical channels. For example, the PDU 300 can be configured for transmission via advertising, periodic, data or isochronous channels. The PDU 300 may include numerous fields including, a PHY preamble 302, an access address 304 (including a physical channel access code), a PHY header 306 (including the logical transport and logical link identifiers), a payload 308, and, optionally, a message integrity check (MIC) 310 (for authenticating the data in the payload).

Figure 3B:
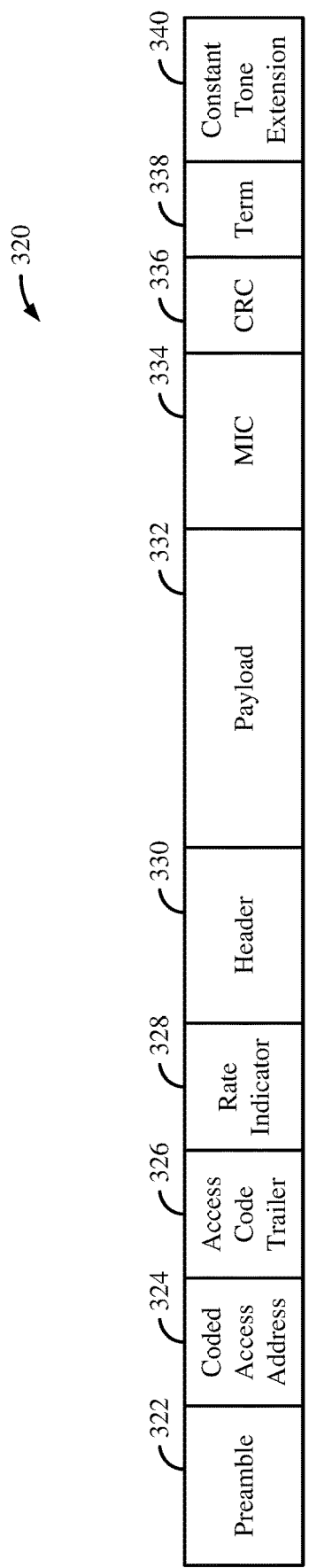
FIG. 3B shows an example PDU configured for transmission on one or more physical channels.

FIG. 3B shows an example PDU 320 configured for transmission on one or more physical channels. For example, the PDU 320 also can be configured for transmission via advertising, periodic, data or isochronous channels. The PDU 320 may include numerous physical layer fields including, for example, a PHY preamble 322, a coded access address 324 (including a physical channel access code), an optional access code trailer 326, a rate indicator 328, a PHY header 330 (including the logical transport and logical link identifiers), a payload 332, and, optionally, one, some or all of a MIC 334 (for authenticating the data in the payload), a cyclic redundancy check (CRC) 336, a termination (TERM) 338, or a constant tone extension 340 (including direction finding information).

The rate indicator 328 enables the transmitting device to dynamically change the modulation, and thus the data rate of the packet, by indicating a modulation used to modulate the subsequent header 330 and the payload 332 (the MIC 334, CRC 336 and TERM 338 also may be modulated using the same modulation as the header and the payload). For example, the rate indicator 308 may indicate one of multiple possible modulation and coding scheme modes including a π/4-Quadrature Phase Shift Keying (QPSK) with ½ coding mode (having an associated data rate of 2 Mbps), a π/4-QPSK with ¾ coding mode (having an associated data rate of 3 Mbps), a π/4-Differential QPSK (DQPSK) with no coding mode (having an associated data rate of 4 Mbps), an 8 Phase Shift Keying (8PSK) with ⅚ coding mode (having an associated data rate of 5 Mbps), and a Differential 8PSK (D8PSK) with no coding mode (having an associated data rate of 6 Mbps).

In the Bluetooth LE core configuration, several types of physical channels are defined including the advertising, periodic, data and isochronous channels referenced herein. The physical channels are divided into time units referred to as events during which STAs 202 may communicate with one another. These events may in turn be sub-divided into sub-events (also referred to herein simply as "events"). For example, such events may include advertising events, connection events and isochronous events. STAs 202 transmit particular types of packets associated with particular types of events on particular physical channels. For example, each connection event is initiated by a master STA 202 via a connection creation procedure. Frequency channel hopping can occur at the start of each connection event. Connection events also may be used to transmit asynchronous data PDUs ("data packets") between STAs 202 via the data channels.

Advertising events may be used to transmit advertising channel PDUs ("advertising packets") via one or more advertising channels to establish pair-wise bidirectional communications via data channels, periodic broadcasts via secondary advertising channels, or isochronous broadcasts via isochronous channels. For example, if an advertising device ("advertiser") is using a connectable advertising event, the initiating device ("initiator") may make a connection request using the same advertising channel on which it received the advertising packet. If the advertiser receives and accepts the connection request, a connection is established and the initiator becomes the master device while the advertiser becomes a slave device. For example, ADV_EXT_IND and ADV_AUX_IND PDUs ("packets") may be transmitted during extended advertising events for scanning purposes or to initiate other devices, while AUX_SYNC_IND PDUs ("packets") may be transmitted during periodic advertising events also for scanning purposes.

Isochronous events may be used to transmit isochronous PDUs ("isochronous packets") between STAs 202 via isochronous channels. The LE isochronous physical channel is characterized by a pseudo-random sequence of PHY channels and by additional synchronization parameters provided by the transmitting STA 202, whether it be the master device in a connected configuration or whether it be a broadcasting device in a connectionless configuration. These synchronization parameters may include a channel map that indicates the set of channels used in the piconet, a pseudo random number used as an index into the complete set of channels, and the timing of the first data packet.

Isochronous data transfer combines features of both synchronous and asynchronous data transfer. For example, in an isochronous data transfer system, each transmission begins with a start packet. Blocks of data are then transmitted asynchronously. Typically, the data must be transmitted with a guaranteed bandwidth to ensure delivery within specified time constraints. As such, isochronous data transfer may be advantageous in applications including voice traffic, streaming video, and streaming audio (for example, between a mobile smartphone and wireless earbuds). There are two general categories of isochronous communications, those between connected STAs 202 and those between unconnected STAs 202.

While example BT communications are described herein, aspects of the present disclosure may be applied to other types of NB communications. For example, a device may be configured to perform a CCA for other types of NB communications including, but not limited to, ultra-narrowband (UNB) communications using suitable protocols or NB communications using a long range (LoRa) protocol. While example WLAN communications are described herein, aspects of the present disclosure may be associated with other types of WB communications, such as LTE communications or other cellular communications.

A wireless medium may be shared by a plurality of STAs, with each STA being configured for one or both of NB communications and WB communications. In some implementations, a STA 104 depicted in FIG. 1 that is configured for WLAN communications (or other WB communications) may be the same as a STA 202 depicted in FIG. 2 that is configured for BT communications (or other NB communications). For example, many mobile phones have WLAN capabilities and BT capabilities. In this manner, a mobile phone may communicate concurrently with a AP and a BT device (such as a BT speaker or another STA). In some implementations, a STA may be configured exclusively for WB communications or exclusively for NB communications. For example, a BT speaker may not include WLAN capabilities. To note, a device to perform NB communications may be in an environment including devices to perform WB communications or may be in an environment in which the wireless medium is used for NB communications exclusively.

As described herein, a wireless communication device to perform NB communications may be configured to perform a CCA for one or more NB channels to prevent interference with other NB communications or WB communications coexisting on the wireless medium. Example implementations of CCA for NB communications are described in more detail below. While the examples are described with reference to NB communications being BT communications and WB communications being WLAN communications for clarity, the examples are not to limit the present disclosure to a specific NB communication technology or a specific WB communication technology. As such, any suitable NB communication technology or WB communication technology may be implemented or otherwise used in performing aspects of the present disclosure.

Figure 4:
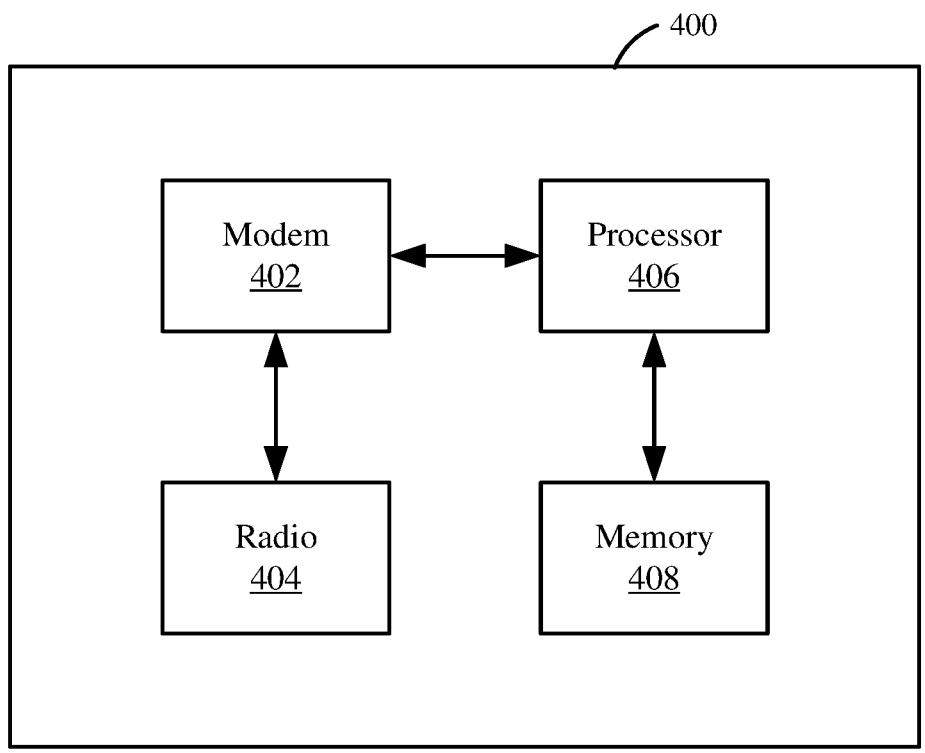
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 202 described herein with reference to FIG. 2. The wireless communication device 400 is capable of transmitting (or outputting for transmission) and receiving wireless communications (for example, in the form of wireless packets). For example, the wireless communication device 400 can be configured to transmit and receive packets in the form of protocol data units (PDUs) conforming to an IEEE 802.15 standard or one or more of the Bluetooth standards defined by the Bluetooth SIG. The wireless communication device 400 can be, or can include, a chip, system on chip (SoC), chipset, package or device that includes one or more modems 402, for example, a Bluetooth-compliant modem. In some implementations, the one or more modems 402 (collectively "the modem 402") additionally may include a WLAN modem (for example, an IEEE 802.11-compliant modem). If the modem 402 includes a WLAN modem, the wireless communication device 400 can be an example of a device for use in a STA 104 or in a AP 102 described herein with reference to FIG. 1. An example wireless communication device for WLAN communications can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be. In some implementations, the modem 402 additionally may include a wireless wide area network (WWAN) modem (for example, a 3GPP 4G LTE or Fifth Generation (5G) New Radio (NR) compliant modem).

In some implementations, the wireless communication device 400 also includes one or more radios 404 (collectively "the radio 404") coupled with the modem 402. The radio 404 may include a BT radio or other NB communications radios. In some implementations, the radio 404 may include a WLAN radio or other WB communications radios. In some implementations, the wireless communication device 406 further includes one or more processors, processing blocks or processing elements 406 (collectively "the processor 406") coupled with the modem 402 and one or more memory blocks or elements 408 (collectively "the memory 408") coupled with the processor 404 or the modem 402.

The modem 402 can include an intelligent hardware block or device such as, for example, an application-specific integrated circuit (ASIC), among other examples. The modem 402 is generally configured to implement a PHY layer, and in some implementations, also a portion of a MAC layer (for example, a hardware portion of the MAC layer). For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer.

For example, for WLAN communications, while in a transmission mode, data obtained from the processor 406 may be provided to an encoder, which encodes the data to provide coded bits. The coded bits may then be mapped to a number Nss of spatial streams for spatial multiplexing or a number NsTs of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 404, for example, by detecting the presence of the signal and estimating the initial timing and frequency offsets. The DSP circuitry is further configured to digitally condition the signal, for example, using channel (narrowband) filtering and analog impairment conditioning (such as correcting for UQ imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, each of the RF transmitters and receivers may include various analog circuitry or DSP circuitry including at least one power amplifier (PA) and at least one low-noise amplifier (LNA), respectively. The RF transmitters and receivers may in turn be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane or at least a portion of a MAC layer configured to perform various operations related to the generation and transmission of frames, PDUs or packets for BT communications or various operations related to the generation, transmission, reception and processing of MPDUs, frames or packets for WLAN communications. In some implementations, the MAC layer is configured to generate MPDUs for provision to the PHY layer for coding, and to receive decoded information bits from the PHY layer for processing as MPDUs. In some implementations, the MAC layer may be configured to allocate time and frequency resources, for example, for OFDMA, among other operations or techniques. In some implementations, the MAC layer may be configured to perform or facilitate the coding and decoding of frames, and resource allocation, among other operations or techniques. The processor 406 may generally control the modem 402 to cause the modem to perform various operations described herein.

The memory 404 can include tangible storage media such as random-access memory (RAM) or read-only memory (ROM), or combinations thereof. The memory 404 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

As used herein, a processing system of a wireless communication device may refer to one or more of the components 404, 406, or 408 of the wireless communication device 400. For example, a processing system may include one or more of at least a portion of the modem 402, the processor 406, or the memory 408. As used herein, an interface of a wireless communication device may refer to one or more of the components 402-404 of the wireless communication device 400. For example, an interface may include one or more of at least a portion of the modem 402 or the radio 404. In some implementations, the interface may include one or more antennas coupled to or included in the wireless communication device. While some examples of a processing system and an interface of a wireless communication device are provided, any suitable components of a wireless communication device may be included in a processing system and an interface of the wireless communication device. As such, the present disclosure is not limited to the provided examples.

Figure 5:
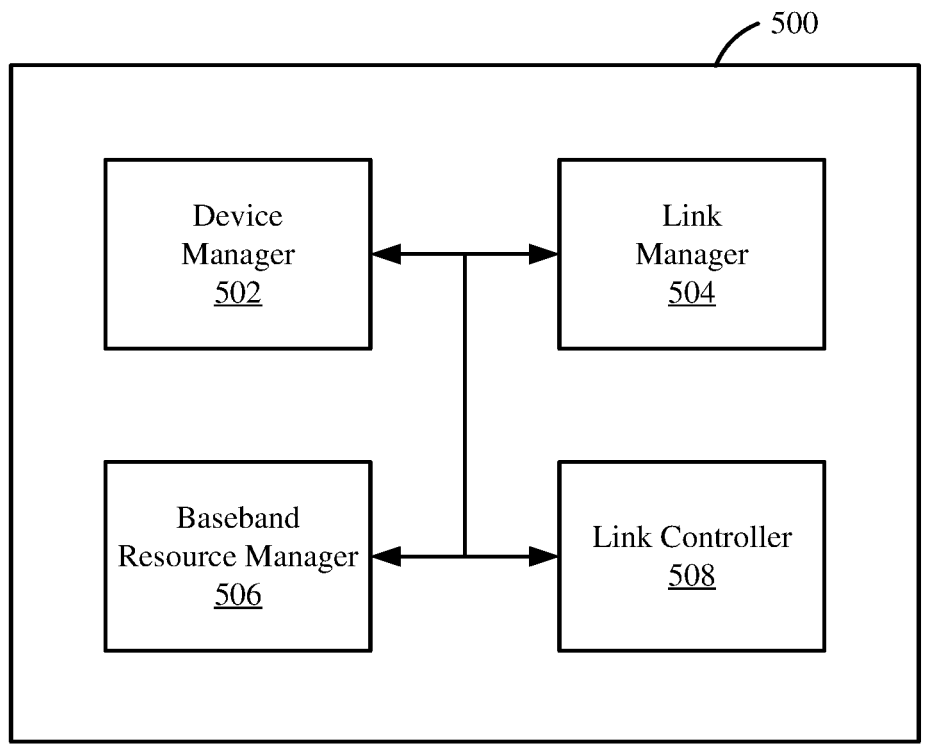
FIG. 5 shows a block diagram of an example medium access control (MAC) layer.

FIG. 5 shows a block diagram of an example MAC layer 500 (also referred to as a "MAC"). For example, the MAC layer 500 may be an example of a MAC layer implemented by the processor 406 described with reference to FIG. 4. The MAC layer 500 may be associated with BT communications. In the illustrated implementation, the MAC layer 500 includes a device manager 502, a link manager 504, a baseband resource manager 506 and a link controller 508. The device manager 502 controls the general behavior of the Bluetooth system and is responsible for discovery and for connecting to other Bluetooth devices, and generally all operations not directly related to data transport. The link manager 504 manages the creation, modification and termination of logical links (including the associated logical transports) as well as the updating of parameters related to the physical links. The baseband resource manager 506 manages access to the wireless medium and is configured to perform scheduling and to enforce QoS requirements. The link controller 508 manages the encoding and decoding of packets. While the MAC layer 500 is described with reference to BT communications, the MAC layer 500 also may be associated with WLAN communications or other types of wireless communications.

Figure 6B:
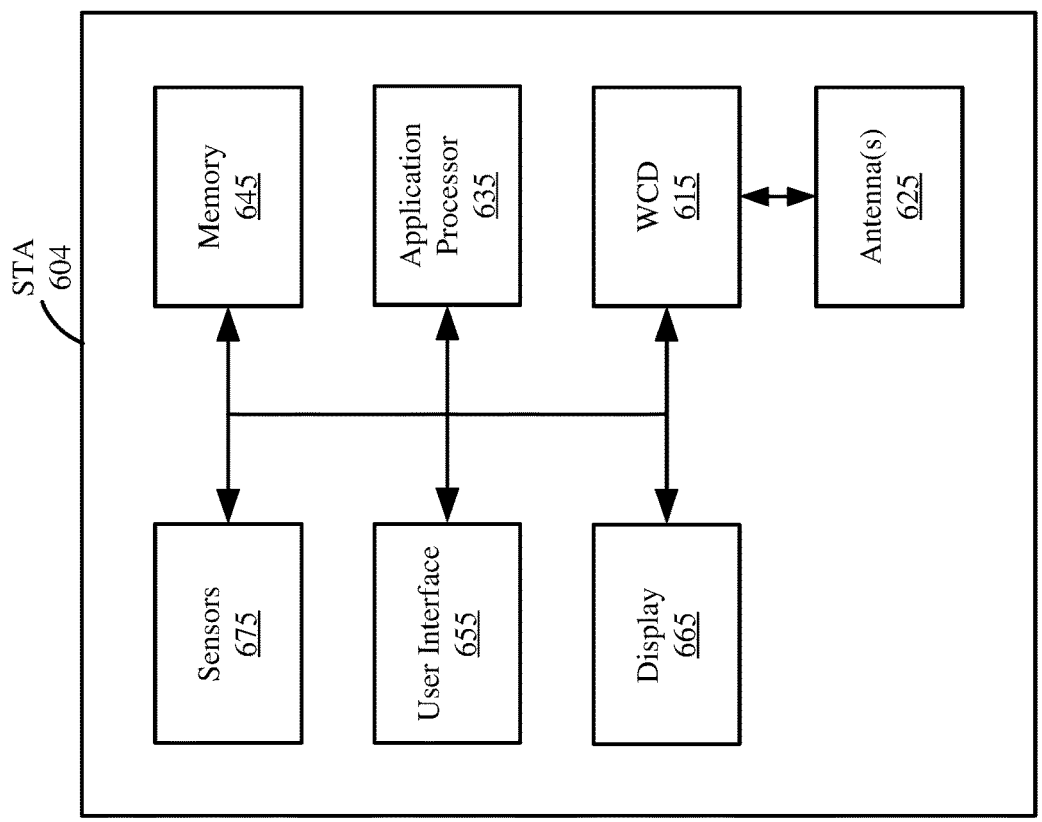
FIG. 6B shows a block diagram of an example station (STA).
Figure 6A:
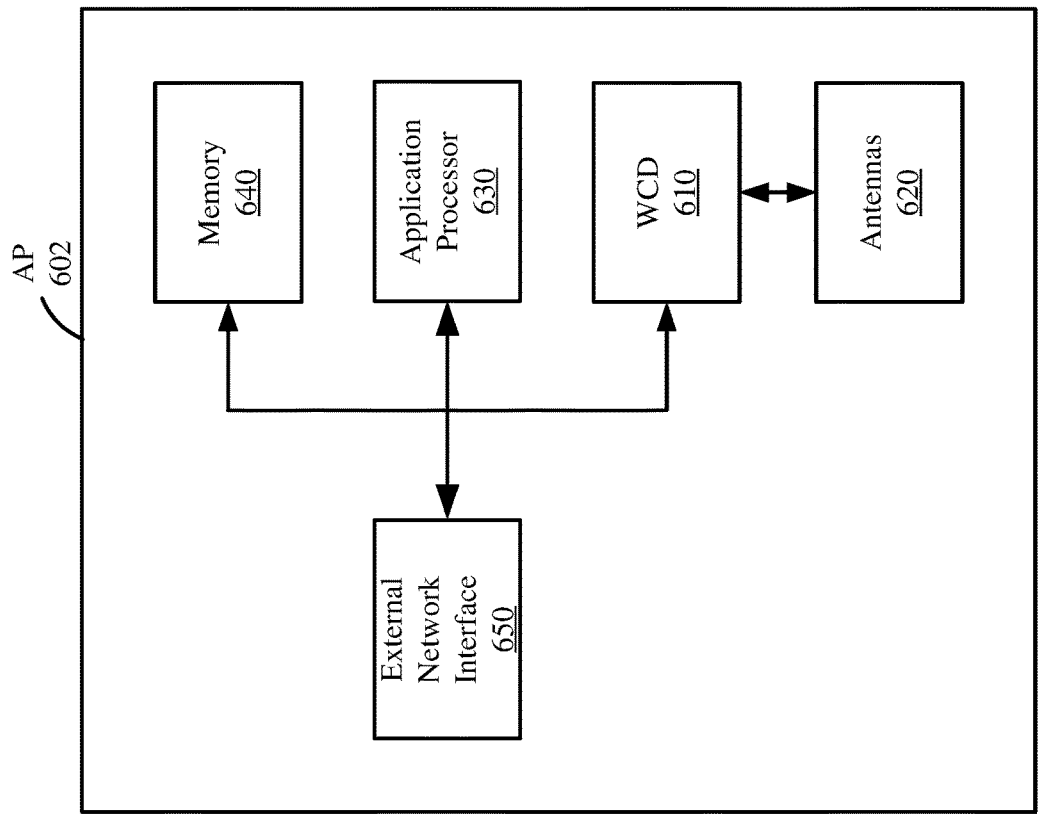
FIG. 6A shows a block diagram of an example access point (AP).

FIG. 6A shows a block diagram of an example AP 602. For example, the AP 602 can be an example implementation of the AP 102 described with reference to FIG. 1 that also supports NB communications (such as BT communications). The AP 602 includes a wireless communication device (WCD) 610 (although the AP 602 may itself also be referred to generally as a wireless communication device as used herein). For example, the wireless communication device 610 may be an example implementation of the wireless communication device 400 described with reference to FIG. 4. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1 that also supports NB communications (such as BT communications) or an example implementation of the STA 202 described with reference to FIG. 2. The STA 604 includes a wireless communication device 615 (although the STA 604 may itself also be referred to generally as a wireless communication device as used herein). For example, the wireless communication device 615 may be an example implementation of the wireless communication device 400 described with reference to FIG. 4. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further may include one or more of a user interface (UI) 655 (such as a touchscreen or keypad) or a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

In some examples, a Bluetooth-compliant AP 602 or STA 604 also may be configured for wireless communication with other networks such as with a Wi-Fi WLAN or a WWAN (for example, a cellular network such as an LTE, 4G or 5G network), which may, in turn, provide access to external networks including the Internet. As such, and as used herein, a wireless communication device, such as one of the devices 102, 104, 202, 400, or 602 described with reference to FIGS. 1, 2, 4, 6A, and 6B, respectively, may refer to a device that is capable of operating within both a Bluetooth network (or other NB communication network) as well as another type of wireless network, such as a WB communication network including a Wi-Fi BSS or within a WWAN cell. To manage coexistence between Bluetooth and WLAN systems, which both operate in the ISM 2.4 GHz band, the use of the shared wireless medium may be time-division multiplexed to ensure that only one of the interfering modems will gain access to the physical wireless medium at any given time. Adaptive frequency hopping (AFH) also improves coexistence with co-located static (non-hopping) systems.

As described herein, devices for WLAN communications perform a CCA to prevent interference on the wireless medium by ensuring a WLAN channel is clear before transmitting on the WLAN channel. Devices for WWAN communications also may perform a CCA to prevent interference on the wireless medium by ensuring a cellular channel is clear before transmitting on the cellular channel. Devices for BT communications use DAA to prevent interference by avoiding a BT channel for an amount of time if the BT channel is busy or interference otherwise occurs on the BT channel. For DAA, the device vacates the BT channel (such as by excluding the BT channel from FH for an amount of time) to prevent interfering with WLAN communications. Interference when the device (configured to perform DAA) first occupies the BT channel may cause latency for a device accessing an overlapping WLAN channel for WLAN communications (such as requiring retransmission as a result of interference from the BT communication). Alternatively, a BT channel may include interference by another BT transmission instead of a WLAN transmission on an overlapping WLAN channel. Multiple devices attempting to access the same NB channel for transmission (such as multiple device attempting to access the same BT channel for transmission) may cause latencies and lower throughput if exclusively DAA is used to prevent interference. In addition, a device may avoid an NB channel for longer than necessary if the interference is caused by another NB transmission instead of a WLAN transmission. For example, a BT transmission on a BT channel may end earlier than a WLAN transmission on a WLAN channel overlapping the BT channel. However, the DAA mechanism may cause a device to vacate the BT channel for longer than needed as a result of the BT channel being occupied regardless of whether the BT channel includes a BT transmission or a coinciding WLAN transmission. In addition, a DAA mechanism may be used to scan for interference infrequently. As such, interference may not be identified for avoiding a frequency segment, which may cause a potentially prolonged disruption on a WB channel in the frequency segment. A CCA mechanism, under which a transmission on a wireless channel is not performed unless the wireless channel is clear, prevents multiple wireless transmissions on a same wireless frequency at the same time. In general, though, NB communication devices (such as BT communication devices) are not configured to perform a CCA to assess whether an NB channel is clear.

Various implementations relate generally to a device configured to perform a CCA for NB communications to overcome the problems with using DAA alone. Example implementations and operations in configuring a CCA for NB communications is described herein with reference to FIGS. 7-20.

Figure 7:
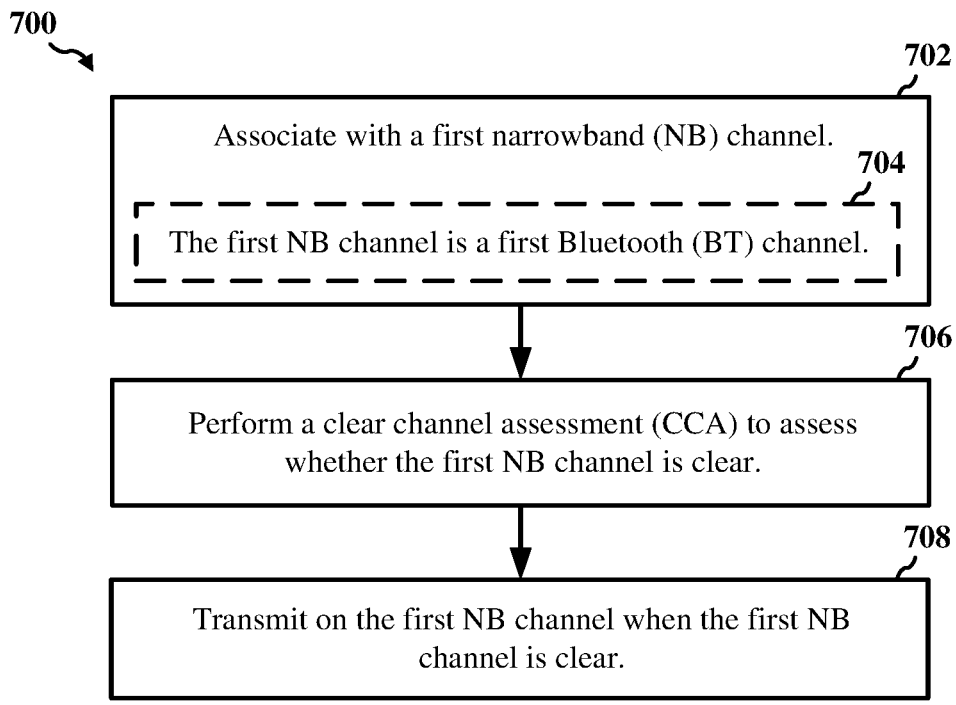
FIG. 7 shows a flowchart illustrating an example process for performing a clear channel assessment (CCA) for narrowband (NB) communications.

FIG. 7 shows a flowchart illustrating an example process 700 for performing a CCA for NB communications. The process 700 may be performed by a wireless communication device, such as the wireless communication device 400 described herein with reference to FIG. 4. The process 700 may be performed by a wireless communication device operating as or within a STA, such as one of the STAs 104, 202, or 604 described herein with reference to FIGS. 1, 2, and 6B respectively, or by a wireless communication device operating as or within a AP, such as one of the APs 102 or 602 described herein with reference to FIGS. 1 and 6A respectively. In some implementations, the process 700 is performed by one or more of a processing system or an interface of a wireless communication device, such as the wireless communication device 400 described with reference to FIG. 4. At least a portion of the process may be performed in a MAC layer, such as the MAC layer 500 described with reference to FIG. 5. While the operations are described as being performed by the wireless communication device 400 for clarity, any suitable device or group of components may perform the operations described within. As such, the present disclosure is not limited to the specific implementation of the wireless communication device 400 performing the operations described herein.

At 702, the wireless communication device 400 associates with a first NB channel. In some implementations, the first NB channel is a first BT channel (704). In this manner, NB communications by the wireless communication device 400 includes BT communications. The first NB channel may be associated with a specific frequency. For example, a BT channel may be one of the 79 one (1) MHz wide channels spanning from 2402 MHz to 2481 MHz as defined for BT. Associating with the first NB channel may include the wireless communication device 400 using the radio 404 to be able to listen to the first NB channel (including receiving a signal on the first NB channel and sensing energy existing on the first NB channel) and be able to transmit on the first NB channel.

At 704, the wireless communication device 400 performs a CCA to assess whether the first NB channel is clear. The CCA may be similar to as described herein for WLAN communications. In some implementations, performing the CCA includes listening to the first NB channel for a first interference and comparing the first interference to an interference threshold. In some implementations, the wireless communication device 400 performs physical carrier sensing for a portion of the frequency spectrum including the first NB channel (such as described herein). As used herein, listening for an interference may refer to listening for one or more frames and measuring the received signal strength of the one or more frames or measuring an energy on a portion of the wireless medium including the first NB channel (such as for physical carrier sensing, which may also be referred to as energy detection (ED)). Regarding receiving one or more frames, any portion of a frame may be used, such as preamble or beginning portion of the frame, to measure a received signal strength. An interference may refer to frames on the wireless medium or other energy on the wireless medium that may interfere with the wireless communication device communicating on the first NB channel (such as transmitting or receiving on the first NB channel). Comparing the first interference to an interference threshold may refer to comparing the received signal strength of the one or more received frames to a threshold to determine whether the portion of the wireless medium transporting the one or more frames is busy. Additionally or alternatively, comparing the first interference to an interference threshold may refer to comparing the total energy received to a threshold to determine if the portion of the wireless medium for which the CCA is performed is busy. As used herein, a portion of the wireless medium (such as one or more NB channels or one or more WB channels) being busy also is referred to as being not clear. Conversely, a portion of the wireless medium that is not busy also may be referred to as clear. In addition or to the alternative of performing physical carrier sensing, the wireless communication device 400 may perform virtual carrier sensing for a portion of the frequency spectrum including the first NB channel.

At 708, the wireless communication device 400 transmits on the first NB channel when the first NB channel is clear. For example, after performing a CCA and determining that the first NB channel is clear for transmission, the wireless communication device 400 may use the modem 402 to modulate a data signal onto the carrier signal of the first NB channel to transmit the data signal to another device. In this manner, the wireless communication device 400 may transmit one or more packets or frames to another device via the first NB channel.

For some CCAs performed by the wireless communication device 400 for an NB channel, the wireless communication device 400 may determine that the NB channel is not clear. For example, the energy measured during CCA may be greater than an energy threshold or a received signal strength of a received packet may be greater than a signal strength threshold to indicate that the NB channel is not clear.

Figure 8:
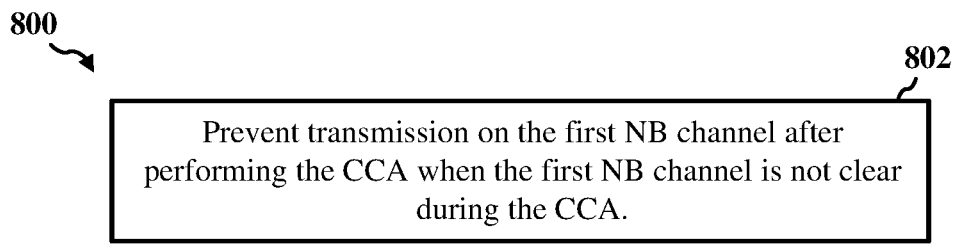
FIG. 8 shows a flowchart illustrating an example process for preventing transmission on a first NB channel after performing a CCA.

FIG. 8 shows a flowchart illustrating an example process 800 for preventing transmission on a first NB channel after performing a CCA. The process 800 may be performed by a wireless communication device, such as the wireless communication device 400 described herein with reference to FIG. 4. The process 800 may be performed in addition to the process 700.

At 802, the wireless communication device 400 prevents transmission on the first NB channel after performing the CCA when the first NB channel is not clear during the CCA. For example, the wireless communication device 400 may have data to be transmitted to another device. With the wireless communication device 400 associated with the first NB channel (702 in of process 700), the wireless communication device 400 performs a CCA to assess whether the first NB channel is clear (704 of process 700). If the wireless communication device 400 determines that the first NB channel is not clear (such as described herein), the wireless communication device 400 prevents transmission of the data on the first NB channel. In this manner, the wireless communication device 400 does not interfere with transmissions from another device that may be occupying the first NB channel. The data may be transmitted at a later time (such as during a later slot for BT communications) or may be dropped from transmission as defined for the NB communications.

In some implementations, the wireless communication device 400 is configured to perform a CCA on a single NB channel (such as a single 1 MHz BT channel). For example, the wireless communication device 400 may measure an energy on the single NB channel and compare the measurement to a threshold to determine if the single NB channel is not clear. In some implementations, the wireless communication device 400 is configured to perform a CCA on a plurality of NB channels concurrently or on another portion of the wireless medium outside of an NB channel. For example, the wireless communication device 400 may perform a CCA for a 5 MHz range, a 10 MHz range, a 20 MHz range, or other suitable range of frequencies. In this manner, performing a CCA to assess whether an NB channel is clear may include performing a CCA for a frequency range including the NB channel. In some implementations, performing a CCA for an NB channel may include performing a CCA for a WLAN channel (or other WB channel) including the NB channel.

As noted herein, for WLAN communications, a CCA is performed on a WLAN channel. For example, a CCA may be performed on one of fourteen 20 MHz channels in the 2.4 gigahertz (GHz) defined by the IEEE 802.11 standards for 802.11b, g, n, or ax. The fourteen 20 MHz channels span from 2401 MHz to 2495 MHz. If the wireless communication device 400 is configured for WLAN communications in addition to NB communications (such as BT communications), the wireless communication device 400 is capable of performing a CCA on any of the fourteen 20 MHz channels. The wireless communication device 400 also may be capable of performing a CCA on multiple 20 MHz channels bonded together (such as on a 40 MHz or 80 MHz channel) or may be capable of performing a CCA on different WLAN channels in the 2.4 GHz, 5 GHz, 6 GHz, or another suitable frequency spectrum.

Referring back to the fourteen 20 MHz channels, if the NB communications type is BT communications, the wireless communication device 400 may be capable of communicating on the 79 1 MHz BT channels spanning from 2402 MHz to 2481 MHz. The fourteen 20 MHz WLAN channels overlap the 79 BT channels. For example, the fourteen WLAN channels include: a WLAN channel 1 from 2401 MHz to 2423 MHz (including a shoulder on either end of the channel) and a center frequency of 2412 MHz; a WLAN channel 2 from 2406 MHz to 2428 MHz and a center frequency of 2417 MHz; a WLAN channel 3 from 2411 MHz to 2433 MHz and a center frequency of 2422 MHz; a WLAN channel 4 from 2416 MHz to 2438 MHz and a center frequency of 2427 MHz; a WLAN channel 5 from 2421 MHz to 2443 MHz and a center frequency of 2432 MHz; a WLAN channel 6 from 2426 MHz to 2448 MHz and a center frequency of 2437 MHz; a WLAN channel 7 from 2431 MHz to 2453 MHz and a center frequency of 2442 MHz; a WLAN channel 8 from 2436 MHz to 2458 MHz and a center frequency of 2447 MHz; a WLAN channel 9 from 2441 MHz to 2463 MHz and a center frequency of 2452 MHz; a WLAN channel 10 from 2446 MHz to 2468 MHz and a center frequency of 2457 MHz; a WLAN channel 11 from 2451 MHz to 2473 MHz and a center frequency of 2462 MHz; a WLAN channel 12 from 2456 MHz to 2478 MHz and a center frequency of 2467 MHz; a WLAN channel 13 from 2461 MHz to 2483 MHz and a center frequency of 2472 MHz; and a WLAN channel 14 from 2473 MHz to 2495 MHz and a center frequency of 2484 MHz. The WLAN channels are overlapping, with the first 13 WLAN channels spaced 5 MHz apart from each other. WLAN channel 1 overlaps BT channel 1 (from 2402 MHz) to BT channel 21 (up to 2423 MHz), WLAN channel 2 overlaps BT channel 5 (from 2406 MHz) to BT channel 26 (up to 2428 MHz), and so on. In this manner, energy or frames on BT channel 26 (from 2427 MHz to 2428 MHz) may cause interference on WLAN channels 2-6.

The wireless communication device 400 performing a CCA to assess whether a BT channel is clear may include the wireless communication device 400 performing a CCA on a WLAN channel (or other suitable WB channel) that overlaps the BT channel. For example, to assess whether BT channel 26 is clear, the wireless communication device 400 may perform a CCA on one or more of WLAN channels 2-6 that overlap BT channel 26. In some implementations, the wireless communication device 400 may perform a CCA on the 20 MHz WLAN channel whose center frequency is closest to the BT channel frequency. For example, the wireless communication device 400 may perform a CCA on WLAN channel 4 (with a center frequency at 2427 MHz) to assess whether BT channel 26 (at 2427 MHz) is clear. Performing a CCA on the WLAN channel may be performed in any suitable manner, such as measuring a received signal strength of a received frame or measuring an energy on the WLAN channel and comparing the measurement to a threshold to determine whether the WLAN channel (and thus the BT channel) is clear. In some implementations, the thresholds used for a CCA for WLAN communications may differ from the thresholds used for a CCA for BT communications. For example, BT low energy (BLE) communications may be associated with a lower amount of energy that can interfere with a transmission as a result of simpler modulations or less transmission power used as compared to other BT communications. In such example, an energy threshold to determine whether a WLAN channel is busy may be greater than an energy threshold to determine whether a BT channel within the WLAN channel is busy. However, any suitable threshold may be used for a CCA to assess whether an NB channel is clear.

Two types of CCA (LBT) exist for wireless communications: load based equipment (LBE) LBT and frame based equipment (FBE) LBT. LBE LBT refers to CCAs performed at times when a device has a load for transmission to another device and needs to contend for the wireless medium. For example, as noted herein, a WLAN may be a wireless network for which access to the wireless medium is governed by a DCF. With a DCF, there is generally no centralized master device allocating time and frequency resources of the shared wireless medium. For WLAN communications, a wireless communication device 400 may not contend for a WLAN channel (including performing a CCA to assess whether the WLAN is clear) unless the wireless communication device 400 has data ready for transmission to a STA or AP of the WLAN. As such, the wireless communication device 400 is configured to perform LBE LBT for WLAN communications.

FBE LBT refers to CCAs performed at defined times or time intervals (such as defined by a master device). For example, for some WWAN communications, a base station (connected to a core network) may indicate an allocation of time and frequency resources of the shared wireless medium for each user equipment serviced by the base station. In this manner, a user equipment may be allocated specific time frames during which the user equipment may use the allocated frequency resources for WWAN communications (such as communicating with the base station). The user equipment may perform a CCA for the allocated frequency resources at a defined time (such as the beginning of the allocated time frames) to assess whether the frequency resources are clear. As such, the wireless communication device 400 may be configured to perform FBE LBT for some WWAN communications.

Some NB communication technologies include access to a wireless medium being managed by a master device. For example, for BT communications, access to a wireless medium is during specific time slots at regular intervals and on specific BT channels according to an FH schedule defined by a master STA. In some implementations, a CCA to assess whether an NB channel (such as a BT channel) is clear may be based on FBE LBT. In this manner, a CCA may be performed during a defined time or at a defined time interval for one or more NB channels. Time may be divided into time frames for NB communications, and FH includes the wireless communication device hopping to a different NB channel for each time frame.

In some implementations, access to an NB channel of one or more NB channels for transmission is during defined time frames. The one or more NB channels may include the first NB channel described herein with reference to process 700. The wireless communication device may be defined to associated with the first NB channel during a first time frame. In this manner, the transmission by the wireless communication device on the first NB channel is to occur during a first time frame of the defined time frames (if the first NB channel is clear). To determine whether the first NB channel is clear for the first time frame, the wireless communication device may perform a CCA at a beginning of the first time frame. As used herein, a beginning of a time frame may refer to within the first 50 microseconds (μs) of the time frame, the first 100 μs of the time frame, or another suitable amount of time at the beginning of the time frame. An example time frame includes a time slot for BT communications, such as described herein. In this manner, a wireless communication device 400 may associate with a first BT channel during a first time frame and perform a CCA at the beginning of the first time frame for the first BT channel, may associate with a second BT channel during a second time frame and perform a CCA at the beginning of the second time frame for the second BT channel, and so on according to an FH schedule shared between a master STA and a slave STA.

Figure 9:
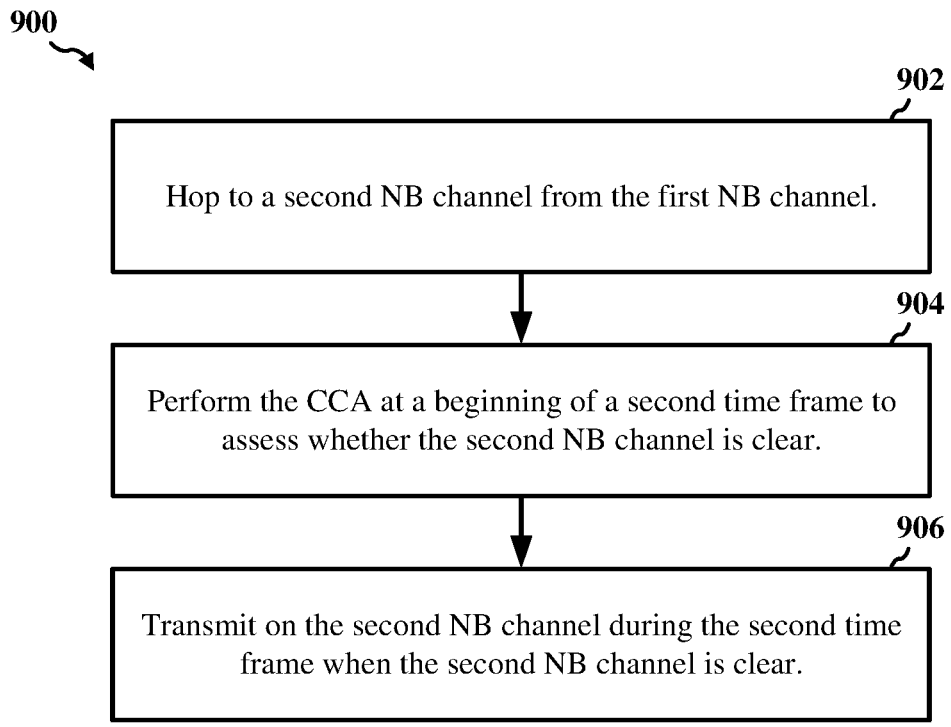
FIG. 9 shows a flowchart illustrating an example process for performing a CCA for frequency hopping (FH) enabled NB communications.

FIG. 9 shows a flowchart illustrating an example process 900 for performing CCA for FH enabled NB communications. The process 900 may be performed by a wireless communication device, such as the wireless communication device 400 described herein with reference to FIG. 4. The process 900 may be performed in addition to the process 700.

Referring back to process 700, the wireless communication device 400 may associate with the first NB channel during a first time frame of the defined time frames (such as for FH). The first NB channel may be included in one or more NB channels for transmission by the wireless communication device 400. For example, the first NB channel may be one of the 79 BT channels, and the one or more NB channels is at least a subset of the 79 BT channels (including the first NB channel).

At 902, the wireless communication device 400 hops to a second NB channel from the first NB channel. The second NB channel may be included in the one or more NB channels also including the first NB channel. For example, FH may include hopping between the first NB channel associated with during a first time frame of the defined time frames to the second NB channel to be associated with during a second time frame of the defined time frames. The second NB channel to be associated with during a second time frame may be indicated by an FH schedule stored by the wireless communication device 400 (such as an FH schedule shared between a slave STA and a master STA for BT communications).

At 904, the wireless communication device 400 performs the CCA at a beginning of the second time frames of the defined time frames to assess whether the second NB channel is clear. Performing the CCA for the second NB channel may be performed as described herein regarding performing the CCA for the first NB channel.

At 906, the wireless communication device 400 transmits on the second NB channel during the second time frame when the second NB channel is clear. For example, after performing a CCA and determining that the first NB channel is clear for transmission, the wireless communication device 400 transmits data via the second NB channel to another device.

As noted herein, for some CCAs performed by the wireless communication device 400 for an NB channel, the wireless communication device 400 may determine that the NB channel is not clear. For example, the energy measured during CCA may be greater than an energy threshold or a received signal strength of a received packet may be greater than a signal strength threshold to indicate that the NB channel is not clear.

Figure 10:
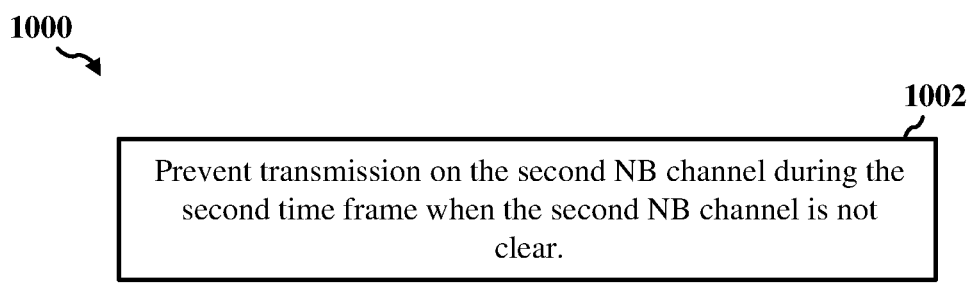
FIG. 10 shows a flowchart illustrating an example process for preventing transmission on a second NB channel after performing a CCA.

FIG. 10 shows a flowchart illustrating an example process 1000 for preventing transmission on a second NB channel after performing a CCA. The process 1000 may be performed by a wireless communication device, such as the wireless communication device 400 described herein with reference to FIG. 4. The process 1000 may be performed in addition to the process 900. At 1002, the wireless communication device 400 prevents transmission on the second NB channel during the second time frame when the second NB channel is not clear. Step 1002 for the second NB channel may be similar to step 802 of process 800 described herein with reference to FIG. 8. For example, if the wireless communication device 400 determines that the second NB channel is not clear via the CCA as described herein, the wireless communication device 400 prevents transmission on the second NB channel during the second time frame.

As noted herein, the CCA may be performed at the beginning of the time frame. Any suitable amount of time of a time frame may be defined as the beginning of the time frame (such as 50 µs, 100 µs, or 200 µs). In some implementations, the beginning of the time frame may refer to an amount of time immediately preceding a potential transmission on the NB channel (such as 200 µs preceding a transmission). If the NB communications includes BT communications, BT communications may be on a bi-directional link between a master STA and a slave STA.

Figure 11:
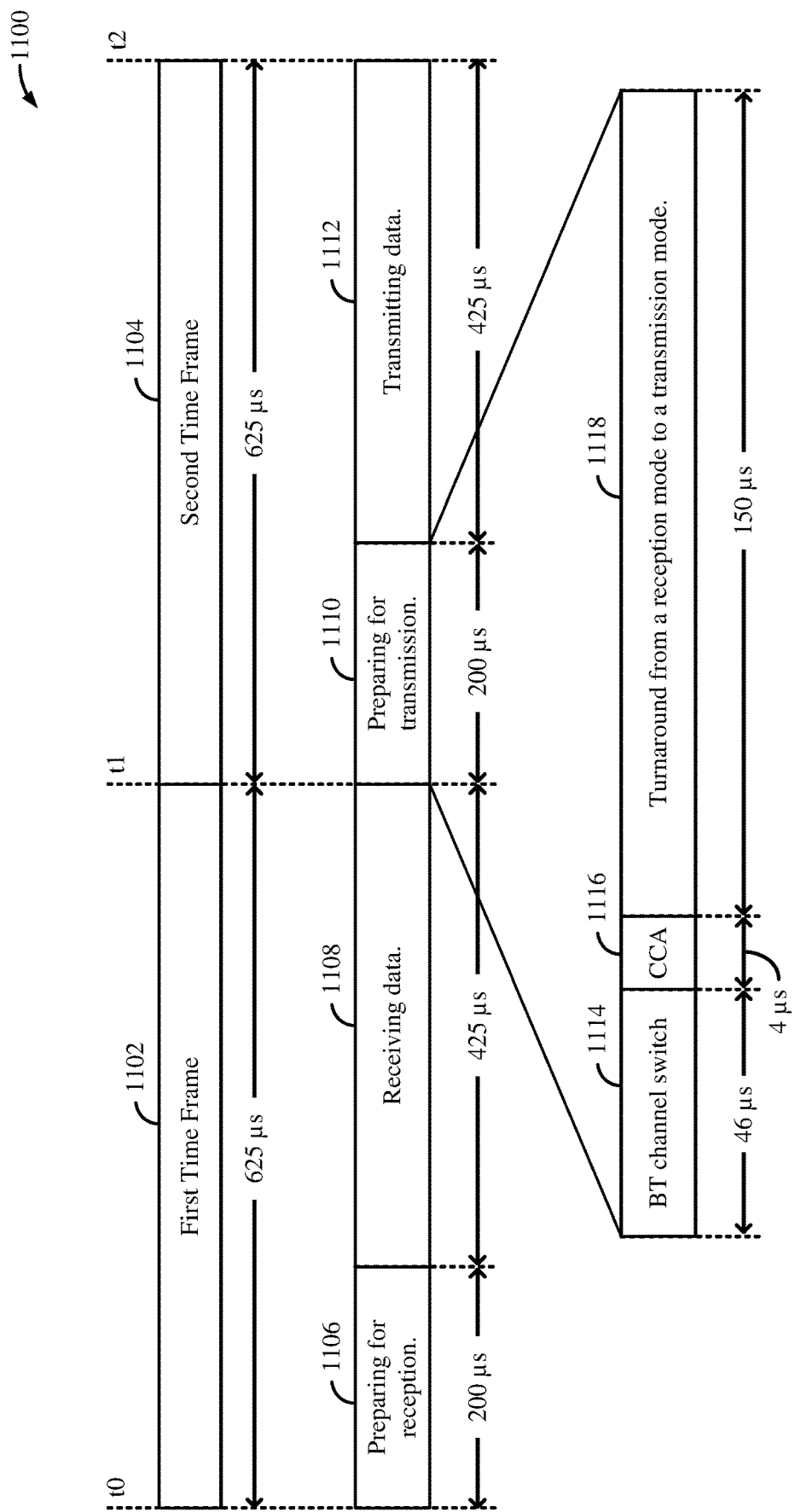
FIG. 11 shows a timing diagram illustrating example Bluetooth communications over a plurality of time frames.

FIG. 11 shows a timing diagram 1100 illustrating example BT communications over a plurality of time frames. The BT communications may be performed by a wireless communication device, such as the wireless communication device 400 described herein with reference to FIG. 4. The timing diagram 1100 is an example depiction for BT communications on a bi-directional link associated with the wireless communication device. The timing diagram 1100 depicts a first time frame 1102 and a second time frame 1104. The time frames 1102 and 1104 may be part of a plurality of time frames, with one or more time frames existing prior to the first time frame 1102 or one or more time frames existing subsequent to the second time frame 1104. For BT communications, a time frame also is referred to as a slot.

Each time frame may be associated with either the wireless communication device being in a reception mode to allow receiving data from another device or being in a transmission mode to allow transmitting data to another device. The number of time frames associated with reception as compared to the number of time frames associated with transmission may be any suitable number. For example, for a synchronous link, the number of time frames associated with reception may equal approximately the number of time frames associated with transmission. For example, the time frames may alternate between transmission and reception. For an asynchronous link, such as for BT audio from the wireless communication device to a BT speaker (for which more data is transmitted to the BT speaker than received from the BT speaker), the number of time frames associated with reception may differ from the number of time frames associated with transmission (such as more time frames being associated with transmission for the wireless communication device in the example of BT audio to a BT speaker). The number of time frames or the specific time frames associated with transmission or reception may be adjusted as necessary.

In the depicted example, the length of each time frame 1102 and 1104 is 625 µs (which is twice the period of a clock signal driven by a system clock with a frequency of 3.2 kilohertz (kHz) that is used for BT communications). The first time frame 1102 spans from time t0 to time t1, and the second time frame 1104 spans from time t1 to time t2. The first time frame 1102 is associated with a reception mode of the wireless communication device, and the second time frame 1104 is associated with a transmission mode of the wireless communication device. In this manner, the wireless communication device may be configured to receive data from another device during the first time frame 1102 and may be configured to transmit data to another device during the second time frame 1104. For a first portion 1106 of the first time frame 1102, the wireless communication device prepares for reception over a BT channel. If data is to be received, the wireless communication device may receive data from another device during the portion 1108 of the first time frame 1102.

For a first portion 1110 of the second time frame 1104, the wireless communication device prepares for transmission over a BT channel. For example, after the first time frame 1102, the wireless communication device is to turnaround from being in a reception mode to a transmission mode. The wireless communication device also may switch BT channels (such as based on an FH schedule) for the second time frame 1104. In this manner, the wireless communication device may receive on a first BT channel during the first time frame 1102 and may transmit on a second BT channel during the second time frame 1104. The wireless communication device may transmit data to another device during the portion 1112 of the first time frame 1104.

As noted herein, two types of CCA that exist include LBE LBT (such as for WLAN communications) and FBE LBT (such as for WWAN communications). If the NB communications are based on a master device scheduling access to the wireless medium (such as for BT communications), implementation of a CCA for the NB communications may be similar to FBE LBT. Conventional FBE LBT mechanisms are defined such that the time between CCA and transmission (such as for some cellular communications) are less than 16 vs. For some NB communications (such as for BT communications), the time between CCA and transmission may be relaxed past 16 µs (such as being greater than 16 µs and being less than or equal to 200 µs).

As depicted in the example timing diagram 1100, an example time length of portion 1106 and portion 1110 at the beginning of the time frames 1102 and 1104, respectively, is 200 µs. In this manner, reception of data and transmission of data by the wireless communication device between neighboring time frames is separated by at least 200 µs.

For BT communications, timings between transmission and reception may be more relaxed than for WLAN communications or for WWAN communications. For example, BT communications may not have the same desired throughput as WLAN communications. Since timings between reception and transmission may be more relaxed for BT communications as compared to WLAN and WWAN communications, the time frames for BT communications may be configured to allow for more time to pass between a CCA performed and a potential transmission by a wireless communication device than for WLAN or WWAN communications. For example, the time between a CCA for a BT channel to be performed by the wireless communication device and when the wireless communication device is to transmit on the BT channel during a time frame may be up to 200 µs (such as up to the length of the portion 1110 of the second time frame 1104). In some implementations, a time between assessing whether a first NB channel is clear and transmitting on the first NB channel is greater than 16 µs and less than or equal to 200 vs. For example, a wireless communication device may be configured to allow more than 16 µs (up to 200 µs) to pass after performing a CCA for a BT channel before transmitting on the BT channel (as compared to less than 16 µs that passes between a CCA and a transmission based on existing FBE LBT mechanisms).

A wireless communication device may be configured to perform a CCA during the beginning of a time frame to assess whether an NB channel is clear before transmitting on the NB channel. In some implementations, the wireless communication device may perform a CCA during the beginning of each time frame that the wireless communication device is to transmit on the NB channel. For example, the wireless communication device may perform a CCA during the beginning of each time frame associated with a transmission mode of the wireless communication device (such as those time frames assigned to BT transmissions by the wireless communication device in an FH schedule between the wireless communication device and another device). In another example, if the wireless communication device is not to transmit during a time frame associated with the wireless communication device being in a transmission mode (such as the wireless communication device having no data queued for transmission), the wireless communication device may not perform a CCA during the time frame. In some implementations, the wireless communication device also may perform a CCA during one or more time frames associated with a reception mode of the wireless communication device.

As noted herein, the wireless communication device may perform a CCA for an NB channel during the beginning of a time frame in which the wireless communication device is to be in a transmission mode to transmit data to another device on the NB channel. In this manner, if the CCA indicates that the NB channel is not clear (such as identifying that an overlapping WB channel is busy or identifying that the NB channel itself is busy using a CCA as described herein), the wireless communication device may prevent transmitting the data during the time frame. If the CCA indicates that the NB channel is clear, the wireless communication device may transmit the data during the time frame. With reference to the timing diagram 1100, the wireless communication device may perform a CCA for a BT channel during the beginning of the second time frame 1104 (such as during portion 1110) before transmitting data to another device during portion 1112 of the second time frame 1104. If the CCA indicates that the BT channel is clear, the wireless communication device transmits data on the BT channel during portion 1112 of the time frame. If the CCA indicates that the BT channel is not clear, the wireless communication device prevents transmitting data on the BT channel during portion 1112 of the time frame.

With the turnaround between reception and transmission depicted as being 200 μs in diagram 1100 (the length of portion 1110 of the time frame 1104), a CCA may be performed at any suitable time up to 200 μs before transmission (during the portion 1110). In one example, portion 1110 is depicted as including sub-portion 1114 associated with switching between BT channels, sub-portion 1116 associated with performing a CCA for the BT channel, and sub-portion 1118 associated with switching from a reception mode to a transmission mode by the wireless communication device. Sub-portion 1114 is an amount of time associated with the wireless communication device switching from a previous BT channel to a current BT channel (as indicated by an FH schedule). The wireless communication device hops from a first BT channel used during the first time frame 1102 to a second BT channel used during the second time frame 1104.

The sub-portion 1114 may be a suitable amount of time to allow hopping from the first BT channel to the second BT channel, including, for example, adjusting a local oscillator for the difference in frequency between the first BT channel and the second BT channel, compensating for any clock drift that may occur between the synchronized clocks of the wireless communication device and another device, or other operations to ensure that the wireless communication device is ready to use the second BT channel. Sub-portion 1114 is depicted as being 46 μs in length but may be any other suitable amount of time.

The sub-portion 1116 may be an amount of time for performing the CCA for the second BT channel. As depicted, the sub-portion 1116 is 4 μs in length. In this manner, the CCA may be performed during the first 50 μs of the second time frame 1104. However, the CCA may be performed at any suitable time during portion 1110 (such as later or earlier). Performing a CCA may require the wireless communication device be in a reception mode to listen on the second BT channel (such as listening to an overlapping WLAN channel, the BT channel exclusively, or a plurality of BT channels in another suitable manner). In this manner, the wireless communication device is able to measure the interference on the BT channel (such as described herein). As depicted in diagram 1100, the wireless communication device is in a reception mode during the first time frame 1102. The wireless communication device may remain in the reception mode during the beginning of the second time frame 1104 (including sub-portions 1114 and 1116) in order to perform the CCA during sub-portion 1116.

After performing the CCA, the wireless communication device may switch from a reception mode to a transmission mode. For example, the wireless communication device may switch from using a receive chain to a transmit chain and configure other components of the interface in switching from a reception mode to a transmission mode. The sub-portion 1118 may be an amount of time associated with a turnaround between a reception mode and a transmission mode by the wireless communication device. The sub-portion 1118 is depicted as being 150 μs, and the CCA is performed at least 150 μs before a transmission by the wireless communication device during portion 1112. While the sub-portion 1118 is depicted as being 150 μs in length, the sub-portion 1118 may be any suitable amount of time of the portion 1110. For example, sub-portion 1114 may be extended, and sub-portion 1118 may be reduced. The entirety of the sub-portion 1118 may not be required for the turnaround, allowing the sub-portion 1118 to be reduced (such as up to as small as 16 μs associated with the gap between CCA and transmission for FBE LTB). In some implementations, the sub-portion 1118 may be greater than 150 vs. For example, if the wireless communication device is not to hop to a different NB channel from a first time frame to a second time frame, a sub-portion associated with a channel switch may be removed or reduced. In another example, the portion 1112 associated with transmission may be reduced to extend sub-portion 1118.

In some implementations, portion 1106 may be similar to portion 1110 but excluding sub-portion 1116. In this manner, the wireless communication device does not perform a CCA during a time frame associated with the wireless communication device being in a reception mode. In some implementations, the wireless communication device may perform a CCA during the first time frame 1102. If the wireless communication device is still in a transmission mode (such as from a time frame immediately preceding the first time frame 1102), the wireless communication device is to switch from the transmission mode to the reception mode before performing the CCA. In this manner, a turnaround for switching between the transmission mode and the reception mode occurs before the CCA is performed. The amount of time for the turnaround may be reduced from 150 μs associated with sub-portion 1118 so that an amount of time exists between the wireless communication device performing the CCA and the wireless communication device listening for data from another device during portion 1108 of the first time frame 1102.

While some examples of performing a CCA for a BT channel or other type of NB channel during one or more time frames are described herein with reference to depiction 1100, any suitable manner in performing a CCA for an NB channel may be performed. For example, the wireless communication device may perform a CCA before each transmission. In this manner, the wireless communication device may perform a CCA for an NB channel to identify that the NB channel is clear before each time the wireless communication device transmits on the NB channel.

As noted herein for process 900 and process 1000, FH may include hopping between the first NB channel and the second NB channel. FH may be configured for any number of NB channels, such as 79 BT channels for BT communications or 40 BLE channels for BLE communications. FH may be configured for hopping among only a portion of the NB channels or among all of the NB channels. In this manner, when a wireless communication device hops to a new NB channel and is to transmit on the new NB channel, the wireless communication device 400 may perform a CCA for the new NB channel to assess whether the NB channel is clear.

Figure 12:
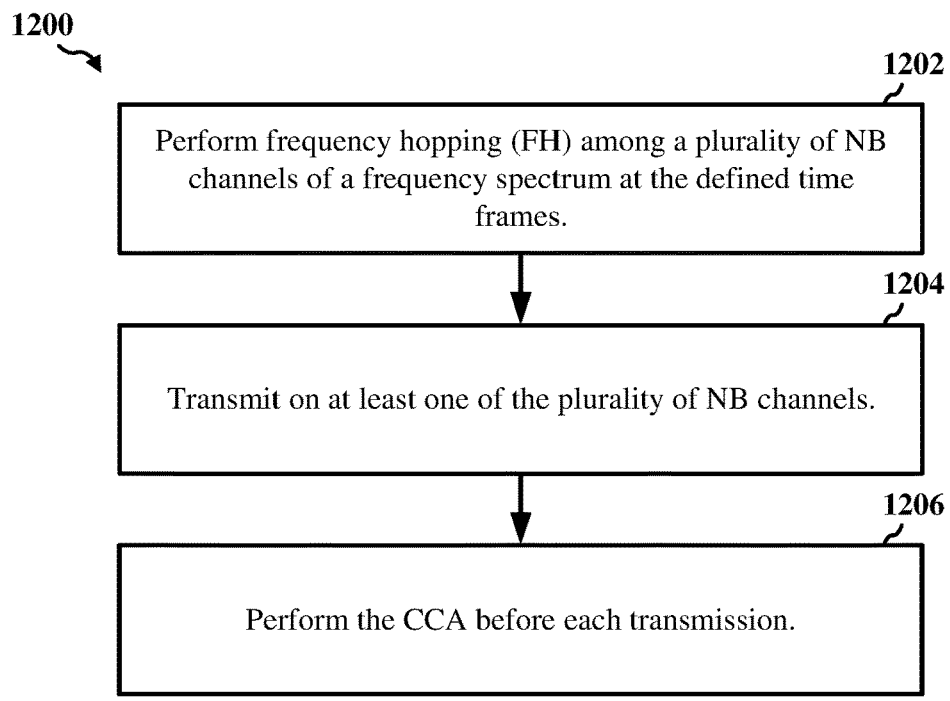
FIG. 12 shows a flowchart illustrating an example process for performing FH.

FIG. 12 shows a flowchart illustrating an example process 1200 for performing FH. The process 1200 may be performed by a wireless communication device, such as the wireless communication device 400 described herein with reference to FIG. 4. The process 1200 may be performed in addition to the process 900.

At 1202, the wireless communication device 400 performs FH among a plurality of NB channels of a frequency spectrum at the defined time frames. As noted herein, FH may be among one or more NB channels. The plurality of NB channels includes the one or more NB channels. For example, the wireless communication device 400 may hop among at least a portion of the 79 BT channels at 625 μs slots for BT communications as governed by an FH schedule shared between the wireless communication device 400 and one or more other devices.

At 1204, the wireless communication device 400 transmits on at least one of the plurality of NB channels. For example, the wireless communication device 400 may transmit on one or more BT channels during a designated time slot governed by the FH schedule.

At 1206, the wireless communication device 400 performs the CCA before each transmission. For example, before the wireless communication device 400 is to transmit on an NB channel, the wireless communication device 400 performs a CCA for the NB channel (such as described herein). If the wireless communication device 400 identifies that the NB channel is clear, the wireless communication device 400 may transmit on the NB channel. In this manner, the wireless communication device 400 identifies that the NB channel is clear before each transmission to reduce interference with coexisting communications (which may be NB or WB communications).

While step 1206 depicts performing a CCA before each transmission, a CCA may not be performed for each hop during FH. For example, some time frames may be associated with the wireless communication device 400 being in a reception mode, and the wireless communication device 400 may not perform a CCA for those time frames. As such, the wireless communication device 400 may not perform a CCA for the hops associated with such time frames. In some implementations, the wireless communication device 400 may be configured to perform a CCA for any suitable time frames and any suitable hops, interval of hops, or even every hop as long as the CCA is performed before each transmission.

Typical BT communications systems employ a DAA mechanism. In this manner, if interference is detected on a BT channel, the device avoids the BT channel for an amount of time. To avoid the BT channel, the FH schedule is adjusted via AFH as defined in the BT set of standards from the BT SIG. Causing a BT channel to be avoided for an amount of time based on the current DAA and AFH mechanisms may cause the BT channel to be avoided for longer than necessary. For example, the current DAA and AFH mechanisms are defined based on the assumption that the interference on a BT channel is from WLAN communications (such as on an overlapping WLAN channel). As such, the amount of time that the BT channel is avoided is many multiples of slots (that may span multiple seconds), thus reducing the number of slots available for FH. Since FH for BT communications may include up to 1600 hops per second, many instances when the BT channel is to be hopped to under the original FH schedule are removed under the adjusted FH schedule. However, interference may be caused by an NB communication (such as another BT transmission on the same BT channel). If the interference is caused by a BT transmission, the receiving and transmitting devices associated with the BT transmission are known to hop away from the BT channel within 625 vs. As such, avoiding the BT channel for seconds as based on the current DAA and AFH mechanisms as a result of interference from another BT transmission causes the BT channel to be avoided for longer than necessary. In addition, the presence of interference using the DAA mechanism may be detected at intervals with a low duty cycle, causing a device to vacate an NB channel only after a prolonged amount of time. Interference to a WB channel may exist during the time the device has not vacated the NB channel. As such, DAA may be less agile in causing a device to avoid interference than CCA.

The wireless communication device 400 may be configured to attempt to discern between interference caused by WB communications or other more persistent sources of interference (such as a microwave) and interference caused by NB communications (such as coexisting BT communications). In some implementations, the wireless communication device 400 may prevent avoiding an NB channel until at least a defined number of CCAs indicate that a plurality of NB channels in a defined frequency segment (such as a frequency range corresponding to a WLAN channel) is not clear in a defined amount of time. In this manner, a threshold number of NB channels (such as BT channels) in the same frequency segment (such as based on a same WLAN channel frequency range) being identified as being not clear within an amount of time may indicate that interference exists from WB communications (such as WLAN communications) or other more persistent interference sources than coexisting NB communications. For example, if the wireless communication device 400 identifies that two BT channels in a WLAN channel are not clear (based on two separate CCAs) within 20 milliseconds (ms), the wireless communication device 400 may avoid the BT channel (and the other BT channels in the WLAN channel) for an amount of time (such as 2 seconds (s)). For BT communications, AFH may be used to adjust the FH schedule only after the defined number BT channels are identified as not being clear in the defined amount of time.

Figure 13:
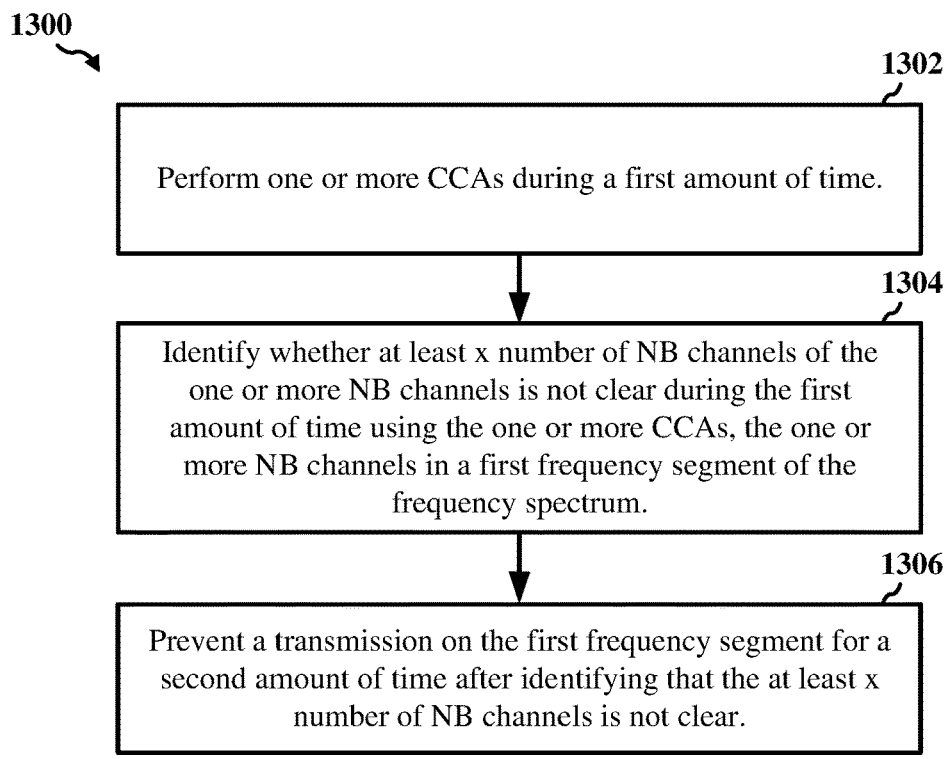
FIG. 13 shows a flowchart illustrating an example process for identifying when to prevent transmission on a frequency segment for an amount of time.

FIG. 13 shows a flowchart illustrating an example process 1300 for identifying when to prevent transmission on a frequency segment for an amount of time. The process 1300 may be performed by a wireless communication device, such as the wireless communication device 400 described herein with reference to FIG. 4. The process 1300 may be performed in addition to the process 1200.

At 1302, the wireless communication device 400 performs one or more CCAs during a first amount of time. For example, the wireless communication device 400 may perform a CCA for each time frame associated with the wireless communication device 400 being in a transmission mode. In another example, the wireless communication device 400 may perform a CCA for time frames associated with the wireless communication device 400 for which the wireless communication device 400 has data queued and ready for transmission. In another example, the wireless communication device 400 may perform a CCA for each and every time frame. In another example, the wireless communication device 400 may perform a CCA for a time frame occurring at an interval of the defined time frames.

At 1304, the wireless communication device 400 identifies whether at least x number of NB channels of the one or more NB channels is not clear during the first amount of time using the one or more CCAs. The one or more NB channels may be in a first frequency segment of the frequency spectrum. For example, for BT communications in a 2.4 GHz frequency spectrum, a first frequency segment may include a frequency range associated with a WLAN channel. While a frequency segment is described herein with reference to a WLAN channel, a frequency segment may be defined for a frequency range associated with other types of interference, such as channels for coexisting WWAN communications.

Integer x may be any suitable integer. x may be defined by a device manufacturer at production or via software or firmware update, may be defined by a user, or may be defined by the device based on previous results from CCAs and interference. x may be static or dynamic. For example, x may be decreased if interference is continued to be seen on one or more NB channels, or x may be increased for a device in an environment with few to no WLANs. x (such as a minimum value for x) may be defined in one or more standards (such as by ETSI or IEEE) or regulations (such as one or more government regulations).

In some implementations, the NB channels to be included in the x number may be NB channels identified using CCAs performed during time frames that are not associated with a transmission mode of the wireless communication device 400. For example, the wireless communication device 400 may be configured to perform a CCA during one or more time frames associated with a reception mode of the wireless communication device 400 (such as during the first time frame 1102 in depiction 1100). In some implementations, only NB channels identified as not clear using a CCA performed during a time frame associated with a transmission mode of the wireless communication device 400 are to be included in the x number. For example, if one or more CCAs are performed during time frames associated with a reception mode of the wireless communication device 400, any NB channels identified as not clear using such CCAs may be excluded from the x number.

At 1306, the wireless communication device 400 prevents a transmission on the first frequency segment for a second amount of time after identifying that the at least x number of NB channels is not clear. For example, if the NB communications are BT communications, x is two, and the first amount of time is 20 ms, the wireless communication device 400 prevents a transmission on the BT channels in the first frequency segment for a second amount of time (such as for 2 s). In some implementations, the wireless communication device 400 uses AFH to have the FH schedule adjusted to avoid the BT channels in the first frequency segment.

The first amount of time and the second amount of time may be any suitable amounts of time. They may be defined by a device manufacturer at production or via software or firmware update, may be defined by a user, or may be defined by the device based on previous results from CCAs and interference. The amounts of time may be static or dynamic. For example, the second amount of time may be increased if interference is continued to be seen on one or more NB channels in the frequency segment, or the second amount of time may be decreased for a device in an environment with few to no WLANs. In some implementations, the second amount of time is defined by the AFH mechanism typically used to avoid a BT channel. One or both of the amounts of time (such as a minimum for the amounts of time) may be defined in one or more standards (such as by ETSI or IEEE) or regulations (such as one or more government regulations).

As described herein, interference from WB communications (such as from WLAN traffic on a WLAN channel) may create a need to avoid one or more NB channels of a frequency segment associated with a WB communication for an amount of time. For example, for BT communications, a plurality of BT channels may be included in a frequency range of a WLAN channel in the 2.4 GHz frequency spectrum. In some implementations, the BT channels may be grouped into frequency segments based on WLAN channels of the same frequency. From the example of 79 BT channels and 14 WLAN channels in the 2.4 GHz frequency spectrum, a first example group of BT channels 1-21 may be associated with WLAN channel 1, a second example group of BT channels 5-26 may be associated with WLAN channel 2, a third example group of BT channels 10-31 may be associated with WLAN channel 3, and so on. In some implementations, a BT channel may be assigned to multiple groups (such as the first example group of BT channels and the second example group of BT channels overlapping at BT channels 5-21). In some other implementations, a BT channel may be assigned to one group such that the groups are independent of each other. If the wireless communication device 400 is to avoid a specific WLAN channel (such as WLAN channel 1), the BT channels associated with the WLAN channel (such as BT channels 1-21 for WLAN channel 1) may be avoided when the WLAN channel is to be avoided. While the example groupings include BT channels at the shoulders of a WLAN channel (such as BT channels 10 and 31 for WLAN channel 3), other example groupings may exclude the BT channels at the shoulders of the WLAN channel. Other example groupings may include the NB channels in a 40 MHz channel (with two 20 MHz channels bonded together), in a 80 MHz channel (with two 40 MHz channels bonded together), in a 10 MHz channel (such as defined for WLAN communications in some countries), or in a frequency segment associated with a different type of WB communication or a separate type of interference.

Repeated indications that NB channels of a frequency segment are not clear may indicate that the frequency segment is not clear. However, a first NB channel identified to be not clear using a first CCA may be clear during a later CCA during the first amount of time (such as during a 20 ms period of time). In some implementations, even if the first NB channel subsequently becomes clear after being identified as not clear, the indication of the first NB channel not being clear still may be used in determining whether a frequency segment is clear (such as being one of the x number of NB channels identified as not being clear during the first amount of time).

In some implementations, the wireless communication device 400 may be configured to store a flag or other indication of an NB channel being identified as not clear in order to determine whether a number of NB channels in a frequency segment identified as not being clear is reached. In this manner, if the wireless communication device 400 identifies that an NB channel in a first frequency segment is not clear, the wireless communication device 400 may set a flag or other indicator for the NB channel. The flag or indicator may be associated with a time (such as identified by a slot number of the associated slot during which the CCA was performed). The time may be used to clear the flag or indicator after the first amount of time. For example, a flag may be reset 20 ms after setting the flag identifying a first NB channel as not clear. A counter or other logic may be used to identify the number of set flags associated with a frequency segment at any suitable instance (such as after performing a CCA for an NB channel in the frequency segment). A comparator (using the defined integer x as a threshold) may compare the output of the counter to the threshold to output an indication as to whether the frequency segment is to be avoided. The wireless communication device 400 may have the FH schedule adjusted to avoid the frequency segment based on the output of the comparator. If an NB channel is associated with multiple frequency segments (such as for multiple WLAN channels that overlap one another), the NB channel may be associated with multiple flags or indicators. Each flag or indicator may be associated with a specific frequency segment. Since an NB channel may be included in multiple frequency segments, a CCA may be associated with multiple frequency segments.

To note, FH may include hopping to or from channels not in the first frequency segment. In this manner, the wireless communication device 400 may hop in and out of the first frequency segment while performing one or more of processes 900, 1200 or 1300. For example, a wireless communication device may hop from a BT channel in WLAN channel 1 to a BT channel in WLAN channel 12 to a BT channel in WLAN channel 6 to another BT channel in WLAN channel 1, and so on. The wireless communication device 400 may be configured to perform CCAs for different frequency segments during a first time period for a first frequency segment as the wireless communication device 400 hops between frequency segments. In this manner, the one or more CCAs during the first amount of time in step 1302 of process 1300 may include CCAs performed for NB channels outside of the first frequency segment. As used herein, hopping from a first NB channel to a second NB channel may include immediately hopping between the NB channels during neighboring time frames or may include one or more intermediate hops to other NB channels after the first NB channel before hopping to the second NB channel.

Referring back to process 700, the wireless communication device 400 may identify that a first NB channel is not clear during step 706. In some implementations and with reference to process 1300 (which may be performed in addition to process 700), the first amount of time to identify whether at least x number of the one or more NB channels is not clear may occur after identifying that the first NB channel is not clear. In this manner, the wireless communication device 400 determines if another x number of NB channels are not clear after identifying the first NB channel to be not clear, and the first NB channel may not be included in the x number of NB channels in process 1300. Integer x may be greater than or equal to one. For example, if x equals one, the wireless communication device 400 prevents a transmission on the first frequency segment if one more NB channel in the frequency segment is identified as not clear within the first amount of time after identifying that the first NB channel is not clear.

Figure 14:
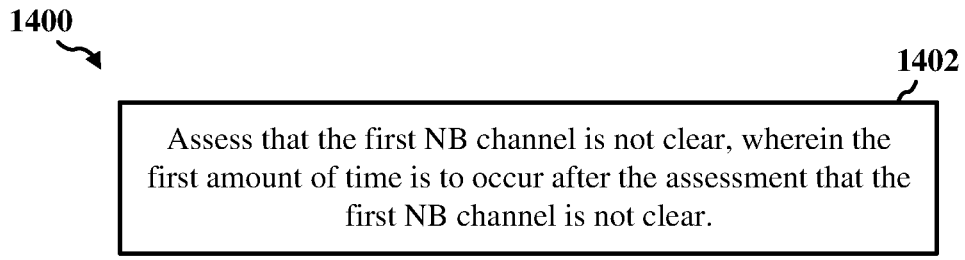
FIG. 14 shows a flowchart illustrating an example process for identifying a number of NB channels as not clear after identifying a first NB channel as not clear.

FIG. 14 shows a flowchart illustrating an example process 1400 for identifying a number of NB channels as not clear after identifying a first NB channel as not clear. The process 1400 may be performed by a wireless communication device, such as the wireless communication device 400 described herein with reference to FIG. 4. The process 1400 may be performed in addition to the process 1300.

At 1402, the wireless communication device 400 assesses that the first NB channel is not clear (such as using the CCA performed for the first NB channel in step 706 of process 700). The first amount of time during which to identify whether at least x number of NB channels is not clear (step 1304 of process 1300) occurs after the assessment by the wireless communication device 400 that the first NB channel is not clear (step 706 of process 700). In this manner, the wireless communication device 400 is to identify x number of NB channels in addition to the first NB channel of the first frequency segment to not be clear before preventing transmission on the first frequency segment for a second amount of time. In some other implementations, the wireless communication device 400 includes the first NB channel as part of the x number of NB channels in determining whether to prevent transmission on the first frequency segment for a second amount of time.

In some implementations, the wireless communication 400 is configured to ensure that the CCAs used to identify that x number of NB channels is not clear are spaced apart by a threshold offset. For example, an NB transmission between other devices on an NB channel may cause interference on neighboring NB channels. If the wireless device 400 performs the CCA for the NB channel during a first time frame and jumps to one of the neighboring NB channels to perform a CCA for the neighboring NB channel during a next time frame, the same NB transmission between the other devices may cause the wireless communication device to assess that both NB channels are not clear during the two time frames. As a result, CCAs that are too close together may cause the wireless communication device 400 to avoid a frequency segment because of interference from an NB communication. Other bursts of temporary interference also may cause similar issues if the CCAs are too close together.

The wireless communication device 400 may be configured to perform a CCA for any time frame. The wireless communication device 400 also may be configured to ensure that the CCAs used in determining to vacate a frequency segment (such as each of the CCAs used to identify the x number of NB channels in a first frequency segment as not clear) are spaced apart from each other by at least a threshold offset in any suitable manner. In some implementations, the CCAs are scheduled in a manner that the CCAs are separated by a threshold offset. In this manner, the wireless communication device 400 is configured to perform CCAs at least a threshold offset from one another. For example, CCAs may be spaced apart to at least every other time frame. For BT communications on a bi-directional link alternating associating slots with a reception mode and a transmission mode of the wireless communication device 400, the wireless communication device 400 may be configured to perform a CCA during every other slot (the slots associated with a transmission mode of the wireless communication device 400).

In some implementations, the schedule of NB channels for FH is defined in a manner to prevent multiple CCAs for a frequency segment from being performed within a threshold offset of each other. For example, the FH schedule may be configured such that the wireless communication device 400 is to hop in and out of the frequency segment. For example, the wireless communication device 400 may be configured to hop to one of a group of BT channels overlapping a WLAN channel and out of the group of BT channels overlapping the WLAN channel so that two neighboring slots are not associated with BT channels overlapping the same WLAN channel. In another example, the FH schedule may be defined to ensure the wireless communication device 400 does not hop between neighboring BT channels.

In some implementations, the wireless communication device 400 is configured to identify when CCAs are not separated by more than a threshold offset in determining whether x number of NB channels are not clear. For example, times associated with the flags identifying the NB channels as not clear (such as the slot numbers) may be compared to determine if the difference is greater than the threshold offset. In this manner, the CCAs may be performed at any time (such as for every time frame), and the wireless communication device 400 may discern that the CCAs used to identify the x number of BT channels as not clear are spaced a threshold offset from each other before preventing transmission on the frequency segment. To note, the threshold offset may be any suitable offset (which may be defined by the device manufacturer, by software, or by the user), and the threshold offset may be static or adjustable. The threshold offset may be in terms of an amount of time (such as in μs) or in terms of a number of time frames (such as a number of slots for BT communications).

As described herein, the wireless communication device 400 may prevent transmission on a first frequency segment when x number of NB channels of the first frequency segment are identified as not clear during a first amount of time. To prevent transmission on the first frequency segment, the wireless communication device 400 may move to a different frequency segment for NB communications.

Figure 15:
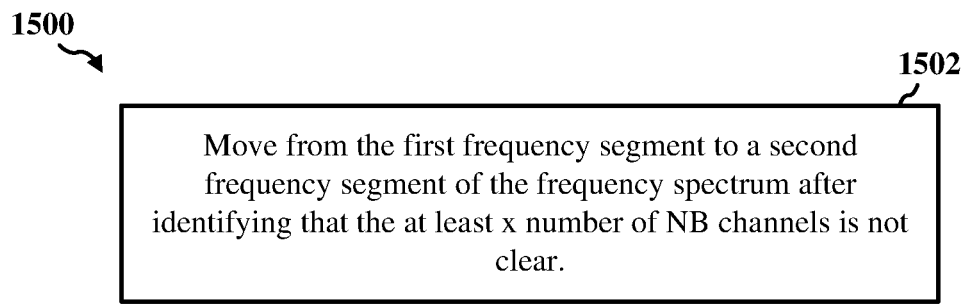
FIG. 15 shows a flowchart illustrating an example process for moving from a first frequency segment to a second frequency segment for NB communications.

FIG. 15 shows a flowchart illustrating an example process 1500 for moving from a first frequency segment to a second frequency segment for NB communications. The process 1500 may be performed by a wireless communication device, such as the wireless communication device 400 described herein with reference to FIG. 4. The process 1500 may be performed in addition to the process 1300.

At 1502, the wireless communication device 400 moves from the first frequency segment to a second frequency segment of the frequency spectrum after identifying that the at least x number of NB channels is not clear. For example, the wireless communication device 400 may have an FH schedule adjusted from including NB channels in the first frequency segment for FH to excluding NB channels in the first frequency segment for FH. The time assigned to the NB channels in the first frequency segment may be assigned to the NB channels in the second frequency segment. If NB communications are BT communications, the BT channels of the first frequency segment may be removed from the FH schedule for a second amount of time. The slots originally scheduled for the BT channels in the first frequency segment may be reassigned to BT channels in the second frequency segment.

The first frequency segment and the second frequency segment may be overlapping or may be mutually exclusive, and each frequency segment may be defined as any suitable range of frequencies. For example, the first frequency segment may be the frequency range for WLAN channel 1, and the second frequency segment may be the frequency range for one or more of WLAN channels 6-14 that do not overlap WLAN channel 1. Moving from the first frequency segment to the second frequency segment may include reassigning slots previously assigned to BT channels in the first frequency segment to BT channels in the second frequency segment in adjusting the FH schedule using AFH. In another example, the first frequency segment may be associated with a WLAN channel, and the second frequency segment may be the entire frequency spectrum for BT communications minus the frequencies associated with the WLAN channel. In this manner, moving from the first frequency segment to the second frequency segment includes excluding use of the BT channels overlapping the WLAN channel (such as reassigning slots previously assigned to BT channels overlapping the WLAN channel to other BT channels not overlapping the WLAN channel in adjusting the FH schedule). To note, if a frequency segment is associated with a WLAN channel, the frequency segment may be equal to or greater than 20 MHz.

Interference may occur in multiple portions of the frequency spectrum. For example, the wireless communication device 400 may determine that BT channels overlapping WLAN channel 1 and BT channels overlapping WLAN channel 8 are to be avoided. In this manner, the wireless communication device 400 may move between segments multiple times, such as excluding BT channels overlapping WLAN channel 1 from use and excluding BT channels overlapping WLAN channel 8 from use. For example, the wireless communication device 400 may exclude different portions of the frequency spectrum from BT communications using AFH by reassigning slots previously assigned to BT channels 1-21 overlapping WLAN channel 1 or BT channels 35-56 overlapping WLAN channel 8 to BT channels 22-24 or 57-79 not overlapping WLAN channel 1 or WLAN channel 8. In the examples herein, each NB channel is depicted as being 1 MHz in size, which corresponds to the size of a BT channel. However, the NB channels may be any suitable size (such as a size less than 20 MHz).

Figure 16:
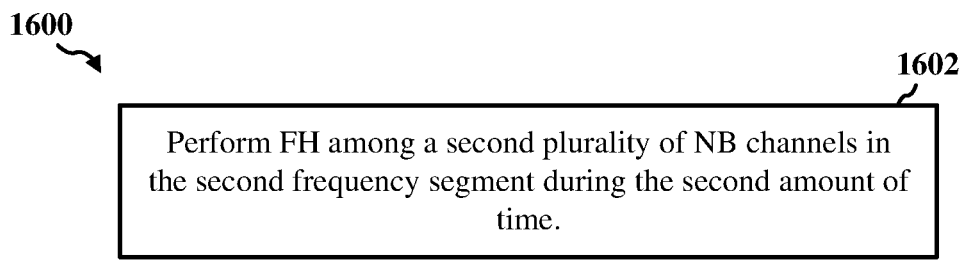
FIG. 16 shows a flowchart illustrating an example process for performing FH after moving from the first frequency segment.

FIG. 16 shows a flowchart illustrating an example process 1600 for performing FH after moving from the first frequency segment. The process 1600 may be performed by a wireless communication device, such as the wireless communication device 400 described herein with reference to FIG. 4. The process 1600 may be performed in addition to the process 1500.

At 1602, the wireless communication device performs FH among a second plurality of NB channels in the second frequency segment during a second amount of time. The second amount of time is the amount of time that the first frequency segment is to be avoided. The first frequency segment and the second frequency segment may be any suitable frequency segments as defined herein. For example, the first frequency segment may include the BT channels overlapping a WLAN channel (such as BT channels in a 20 MHz frequency segment), and the second frequency segment may include the remaining BT channels not overlapping the WLAN channel (such as the BT channels not in the 20 MHz frequency segment). The FH schedule may be adjusted from including the BT channels overlapping the WLAN channel (for which the FH schedule also may include the other BT channels) to including only the BT channels not overlapping the WLAN channel. After the second amount of time passes (such as 2 s), the wireless communication device 400 may go back to using the avoided frequency segment (such as again adjusting the FH schedule to include NB channels in the previously avoided frequency segment). In some implementations, the wireless communication device 400 may include a timer or other means to determine when to again adjust the FH schedule to allow moving back to the first frequency segment. In some implementations, the wireless communication device 400 may reset the FH schedule periodically to thus allow use of the NB channels in the first frequency segment. As noted herein, the first frequency segment may be equal to or greater than 20 MHz, which is associated with the size of a WLAN channel.

Referring back to process 1300, the wireless communication device 400 may identify whether a number of NB channels in a first frequency segment are not clear to determine whether transmission in the first frequency segment is to be prevented. In some implementations, the wireless communication device 400 may prevent transmitting on the first frequency segment based on a sufficient number of CCAs indicating that one or more NB channels in the first frequency segment are not clear. In this manner, preventing transmission on the first frequency segment may be based on a number of CCAs in contrast to being based on a number of NB channels, as described herein with reference to process 1300.

Figure 17:
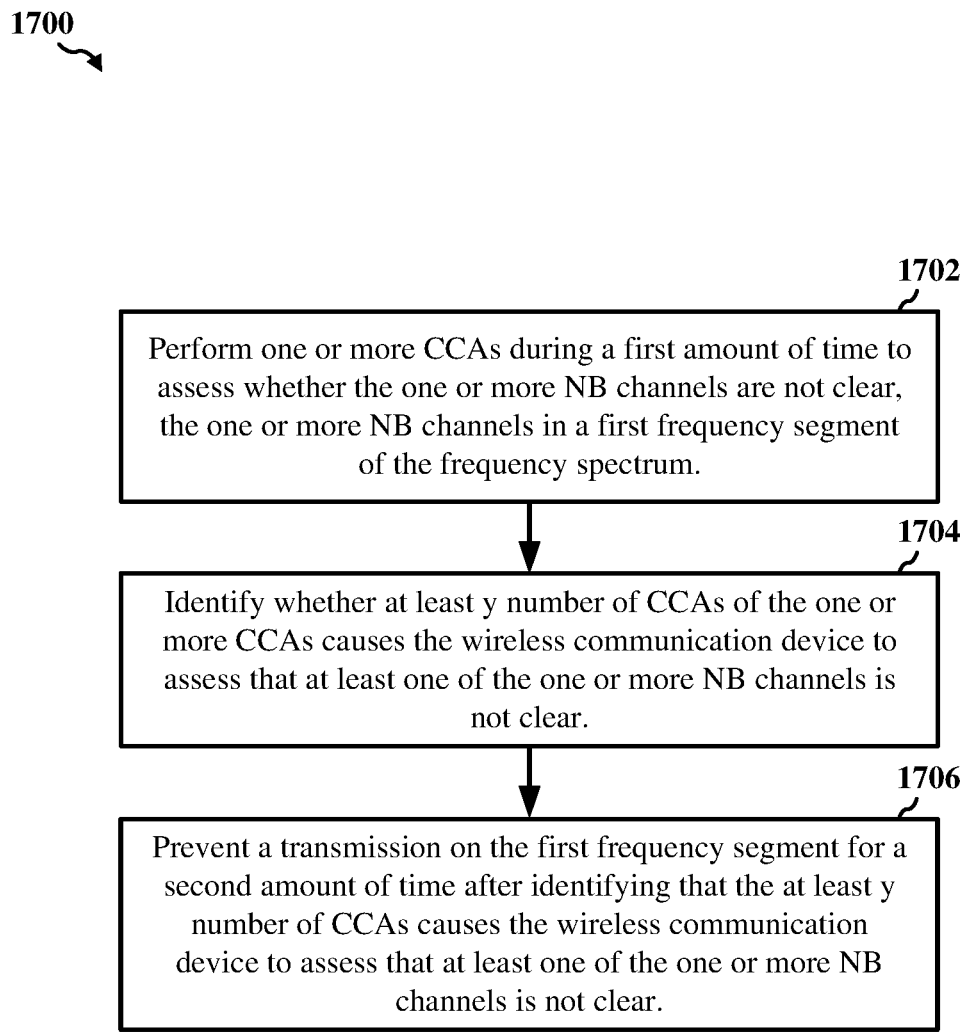
FIG. 17 shows a flowchart illustrating another example process for identifying when to prevent transmission on a frequency segment for an amount of time.

FIG. 17 shows a flowchart illustrating another example process 1700 for identifying when to prevent transmission on a frequency segment for an amount of time. The process 1700 may be performed by a wireless communication device, such as the wireless communication device 400 described herein with reference to FIG. 4. The process 1700 may be performed in addition to the process 1200.

At 1702, the wireless communication device 400 performs one or more CCAs during a first amount of time to assess whether one or more NB channels in a first frequency segment of the frequency spectrum are not clear. Step 1702 may be similar to step 1302 of process 1300 as described herein. For example, the wireless communication device 400 performs a pluralities a CCAs for a plurality of different NB channels. In one example, the wireless communication device 400 may perform a CCA for an NB channel at the beginning of each time frame associated with a transmission mode of the wireless communication device 400. The wireless communication device 400 also may perform FH among one or more NB channels in the first frequency segment. For example, the wireless communication device 400 may perform FH among a plurality of NB channels (which may be in or out of the first frequency segment), with the plurality of NB channels including the one or more NB channels. In a specific example regarding BT communications, a first frequency segment may be a range of frequencies associated with WLAN channel 1 and may include the BT channels that overlap WLAN channel 1. The wireless communication device 400 may perform FH across the entire frequency spectrum of 79 BT channels (which includes the BT channels in the first frequency segment).

At 1704, the wireless communication device 400 identifies whether at least y number of CCAs of the one or more CCAs causes the wireless communication device to assess that at least one of the one or more NB channels is not clear. As compared to step 1304 of process 1300, step 1704 includes the wireless communication device 400 determining the number of CCAs instead of the number of NB channels. In some instances, the number of CCAs may equal the number of NB channels. For example, two separate CCAs during a first amount of time may be used to identify that two separate NB channels in the first frequency segment are not clear. In this manner, the number of CCAs is two and the number of NB channels is two. In some instances, the number of CCAs may equal the number of NB channels. For example, the wireless communication device 400 may hop back to a first NB channel previously identified to be not clear using a first CCA during a first time frame. The wireless communication device 400 may perform a second CCA during the later time frame to assess whether the first NB channel is not clear during the later time frame. If the first NB channel is not clear, the wireless communication device 400 determines that two CCAs cause the wireless communication device 400 to assess that at least one of the NB channels in the first frequency segment is not clear as compared to the wireless communication device 400 determining that one NB channel is not clear (with the same NB channel being identified as not clear for both CCAs).

Integer y may be any suitable integer. y may be defined by a device manufacturer at production or via software or firmware update, may be defined by a user, or may be defined by the device based on previous results from CCAs and interference. y may be static or dynamic. For example, y may be decreased if interference is continued to be seen on one or more NB channels, or y may be increased for a device in an environment with few to no WLANs. In some implementations, integer y may be similar to integer x described herein with reference to process 1300. In some implementations, y is 2. In this manner, if two CCAs at different times within the first time period cause the wireless communication device 400 to assess that one or more NB channels in the first frequency segment are not clear, the wireless communication device 400 may determine that the first frequency segment is not clear. y (such as a minimum value for y) may be defined in one or more standards (such as by ETSI or IEEE) or regulations (such as one or more government regulations).

At 1706, the wireless communication device 400 prevents a transmission on the first frequency segment for a second amount of time after identifying that the at least y number of CCAs causes the wireless communication device to assess that at least one of the one or more NB channels is not clear. Step 1706 may be similar to step 1306 of process 1300 as described herein. For example, the wireless communication device 400 may have an FH schedule adjusted to avoid the NB channels in the first frequency segment for the second amount of time.

If the number of CCAs are to be counted, the wireless communication device 400 may use an identifier associated with the CCA to indicate that a CCA identifies an NB channel as not clear. The identifier also may be associated with the frequency segment including the NB channel. As noted herein, an NB channel may be associated with multiple frequency segments in some implementations. In this manner, the identifier associated with the CCA may indicate the multiple frequency segments to which the NB channel belongs. The wireless communication device 400 may store the identifiers for at least the first period of time. In some implementations, if the CCAs are performed periodically (such as every other time frame), the wireless communication device 400 may store the identifiers for at least a number of previous CCAs corresponding to the first period of time. For example, if the first period of time is 20 ms, each time frame is 625 μs, and a CCA is performed during every other time frame, the wireless communication device 400 may store the identifiers for at least the last 32 CCAs (20,000

μs/625 μs). The wireless communication device 400 may count the number of stored identifiers that are associated with a specific frequency segment at any instance to determine if a y number of CCAs is reached for the frequency segment. In some implementations, an identifier includes a timer, and each of the CCAs identifying an NB channel as not clear is associated with a timer. The timer indicates whether a CCA should still be counted as one of the at least y number of CCAs. When a CCA is used to identify a NB channel as not clear, a timer associated with the CCA may be set to the first amount of time and count down to zero or set to zero and count up to the first amount of time. The timer expires once the timer reaches zero or the first amount of time, and the timer expiring indicates that the CCA is no longer to be included in identifying y number of CCAs. In identifying at least y number of CCAs, the wireless communication device 400 may identify whether each of the at least y timers associated with the at least y number of CCAs is not expired. An expired timer may be deleted (if embodied in software) or reused for a new CCA being performed. While some examples for determining whether y number of CCAs is reached are provided herein, any suitable means for tracking and determining the number of CCAs may be performed.

In some implementations, the CCAs included in the y number may be CCAs performed during time frames that are not associated with a transmission mode of the wireless communication device 400. For example, the wireless communication device 400 may be configured to perform a CCA during one or more time frames associated with a reception mode of the wireless communication device 400 (such as during the first time frame 1102 in depiction 1100). In some implementations, only CCAs associated with a transmission mode of the wireless communication device 400 are to be included in the y number. For example, if one or more CCAs are performed during time frames associated with a reception mode of the wireless communication device 400, such CCAs may be excluded from the y number.

Various aspects for identifying whether the first frequency segment is not clear and avoiding the first frequency segment with reference to process 1700 may be similar to aspects described herein with reference to process 1300. For example, the first amount of time and the second amount of time may be similar (such as being 20 ms and 2 s, respectively). In some implementations, the only difference between process 1300 and process 1700 is that the wireless communication device counts the number of CCAs instead of the number of NB channels for the first frequency segment. As another example of similar aspects that may exist between process 1300 and process 1700, the first amount of time may occur after an assessment that a first NB channel is not clear (such as described herein with reference to process 1400).

FIG. 18 shows a flowchart illustrating an example process 1800 for identifying a number of CCAs after identifying a first NB channel as not clear. The process 1800 may be performed by a wireless communication device, such as the wireless communication device 400 described herein with reference to FIG. 4. The process 1800 may be performed in addition to the process 1700.

At 1802, the wireless communication device 400 assesses that the first NB channel is not clear, with the first amount of time to occur after the assessment that the first NB channel is not clear. Assessing that the first NB channel is not clear may be during the CCA performed in step 706 of process 700. The CCA to cause the wireless communication device 400 to identify that the first NB channel is not clear is not included in the y number of CCAs in step 1704 of process 1700. In this manner, the wireless communication device 400 is to identify y number of CCAs in addition to the CCA for the first NB channel before preventing transmission on the first frequency segment for a second amount of time. In some other implementations, the wireless communication device 400 includes the CCA for the first NB channel as part of the y number of CCAs in determining whether to prevent transmission on the first frequency segment for a second amount of time. In another example of similar aspects that may exist between process 1300 and process 1700, the wireless communication device 400 may move from a first frequency segment to a second frequency segment (such as described herein with reference to process 1500).

FIG. 19 shows a flowchart illustrating an example process 1900 for moving from a first frequency segment to a second frequency segment for NB communications. The process 1900 may be performed by a wireless communication device, such as the wireless communication device 400 described herein with reference to FIG. 4. The process 1900 may be performed in addition to the process 1700.

At 1902, the wireless communication device 400 moves from the first frequency segment to a second frequency segment of the frequency spectrum after identifying that the at least y number of CCAs causes the wireless communication device to assess that at least one of the one or more NB channels is not clear. Step 1902 may be similar to step 1502 of process 1500. For example, the wireless communication device 400 may have an FH schedule adjusted from including NB channels in the first frequency segment for FH to excluding NB channels in the first frequency segment for FH. The time assigned to the NB channels in the first frequency segment may be assigned to the NB channels in the second frequency segment. If NB communications are BT communications, the BT channels of the first frequency segment may be removed from the FH schedule for a second amount of time. The slots originally scheduled for the BT channels in the first frequency segment may be reassigned to BT channels in the second frequency segment. The first frequency segment and the second frequency segment may be the same as described herein with reference to process 1500 and in other examples herein. In addition to process 1900 and similar to process 1600 described herein regarding FH, the wireless communication device 400 may perform FH after moving from the first frequency segment to the second frequency segment.

FIG. 20 shows a flowchart illustrating an example process 2000 for performing FH after moving from the first frequency segment. The process 2000 may be performed by a wireless communication device, such as the wireless communication device 400 described herein with reference to FIG. 4. The process 2000 may be performed in addition to the process 1900.

At 2002, the wireless communication device performs FH among a second plurality of NB channels in the second frequency segment during a second amount of time. Step 2002 is the same as step 1602 of process 1600. For example, the second amount of time is the amount of time that the first frequency segment is to be avoided. The first frequency segment and the second frequency segment may be any suitable frequency segments as defined herein. For example, the first frequency segment may include the BT channels overlapping a WLAN channel (such as BT channels in a 20 MHz frequency segment), and the second frequency segment may include the remaining BT channels not overlapping the WLAN channel (such as the BT channels not in the 20 MHz frequency segment). The FH schedule may be adjusted from including the BT channels overlapping the WLAN channel (for which the FH schedule also may include the other BT channels) to including only the BT channels not overlapping the WLAN channel. After the second amount of time passes (such as 2 s), the wireless communication device 400 may go back to using the avoided frequency segment (such as again adjusting the FH schedule to include NB channels in the previously avoided frequency segment).

In some implementations, the first frequency segment may be equal to or greater than 20 MHz. In some implementations, y may equal 2. In some implementations, each NB channel may be a 1 MHz channel (such as 1 MHz BT channels). In this manner, the variables defined for process 1300 described herein (such as the first amount of time equal to 20 ms, the second amount of time equal to 2 s, x equal to two, NB channel size equal to 1 MHz, and the first frequency segment size equal to or greater than 20 MHz) may be the same as the variables defined for process 1700 (with y equal to 2).

While process 1300 and process 1700 are described as exclusive processes herein, in some implementations, the wireless communication device 400 may perform a combination of process 1300 and process 1700. For example, the wireless communication device 400 may count the number of NB channels and count the number of CCAs. The wireless communication device 400 may prevent transmission on the first frequency segment if both the number of NB channels counted is at least the number x and the number of CCAs is at least the number y. In this manner, a minimum number of NB channels are identified as not clear and a minimum number of CCAs are used to identifying the NB channels as not clear. Other variations of the examples herein may be performed without varying from the scope of the disclosure.

As described herein, a device may be configured to perform CCAs for NB communications. Through the use of CCAs instead of exclusively relying on a DAA mechanism, throughput for the NB communications may be increased. Throughput for coexisting WB communications also may be increased. For example, by implementing the use of CCA for BT communications coexisting with other BT communications and WLAN communications, the throughput for the BT communications and the WLAN communications may be increased by reducing latency at different instances during which interference would have occurred without the use of CCA for BT communications.

Implementation examples are described in the following numbered clauses:

1. A wireless communication device for narrowband (NB) communications, including:
   a processing system configured to:
     perform a clear channel assessment (CCA) to assess whether a first NB channel is clear; and
   an interface configured to:
     associate with a first NB channel; and
     transmit on the first NB channel when the first NB channel is clear.
2. The wireless communication device of clause 1, where:
   NB communications include Bluetooth® (BT) communications; and
   the first NB channel is a first BT channel.
3. The wireless communication device of one or more of clauses 1 or 2, where:
   a first frequency spectrum includes the first BT channel, the first frequency spectrum being used for wideband (WB) communications.
4. The wireless communication device of one or more of clauses 1-3, where:
   WB communications include wireless local area network (WLAN) communications.
5. The wireless communication device of clause 1, where:
   the interface is configured to:
     prevent transmission on the first NB channel after performing the CCA when the first NB channel is not clear during the CCA.
6. The wireless communication device of clause 1, where:
   in performing the CCA to assess whether the first NB channel is clear:
     the interface is configured to:
       listen to the first NB channel for a first interference; and
     the processing system is configured to:
       compare the first interference to an interference threshold.
7. The wireless communication device of clause 1, where:
   access to an NB channel of one or more NB channels for transmission is during defined time frames, the one or more NB channels including the first NB channel;
   transmission by the wireless communication device on the first NB channel is to occur during a first time frame of the defined time frames; and
   the CCA to assess whether the first NB channel is clear occurs at a beginning of the first time frame.
8. The wireless communication device of one or more of clauses 1 or 7, where:
   the interface is configured to:
     hop to a second NB channel from the first NB channel, the one or more NB channels including the second NB channel; and
     transmit on the second NB channel during a second time frame of the defined time frames when the second NB channel is clear; and
   the processing system is configured to:
     perform the CCA at a beginning of the second time frame to assess whether the second NB channel is clear.
9. The wireless communication device of one or more of clauses 1, 7, or 8, where:
   the interface is configured to:
     prevent transmission on the second NB channel during the second time frame when the second NB channel is not clear.
10. The wireless communication device of one or more of clauses 1, 7, or 8, where:
    the interface is configured to:
      perform frequency hopping (FH) among a plurality of NB channels of a frequency spectrum at the defined time frames, the plurality of NB channels including the one or more NB channels; and
      transmit on at least one of the plurality of NB channels; and the processing system is configured to:
    perform the CCA before each transmission.
11. The wireless communication device of one or more of clauses 1, 7, 8, or 10, where:
    the processing system is configured to:
      perform one or more CCAs during a first amount of time; and
      identify whether at least x number of NB channels of the one or more NB channels is not clear during the first amount of time using the one or more CCAs, the one or more NB channels in a first frequency segment of the frequency spectrum; and the interface is configured to:
  prevent a transmission on the first frequency segment for a second amount of time after identifying that the at least x number of NB channels is not clear.
12. The wireless communication device of one or more of clauses 1, 7, 8, 10, or 11, where:
the processing system is configured to:
  assess that the first NB channel is not clear, where the first amount of time is to occur after the assessment that the first NB channel is not clear.
13. The wireless communication device of one or more of clauses 1, 7, 8, or 10-12, where:
each of the one or more CCAs occurs at least a threshold offset after assessing that the first NB channel is not clear.
14. The wireless communication device of one or more of clauses 1, 7, 8, 10, or 11, where:
the interface is configured to:
  move from the first frequency segment to a second frequency segment of the frequency spectrum after identifying that the at least x number of NB channels is not clear.
15. The wireless communication device of one or more of clauses 1, 7, 8, 10, 11, or 14, where:
the interface is configured to:
  perform FH among a second plurality of NB channels in the second frequency segment during the second amount of time.
16. The wireless communication device of one or more of clauses 1, 7, 8, 10, or 11, where one or more of:
x equals 2;
the first amount of time is 20 milliseconds (ms);
the second amount of time is 2 seconds (s);
each NB channel is a 1 Megahertz (MHz) channel; or
the first frequency segment is equal to or greater than 20 MHz.
17. The wireless communication device of one or more of clauses 1, 7, 8, or 10, where:
the processing system is configured to:
  perform one or more CCAs during a first amount of time to assess whether the one or more NB channels are not clear, the one or more NB channels in a first frequency segment of the frequency spectrum; and
  identify whether at least y number of CCAs of the one or more CCAs causes the wireless communication device to assess that at least one of the one or more NB channels is not clear; and the interface is configured to:
    prevent a transmission on the first frequency segment for a second amount of time after identifying that the at least y number of CCAs causes the wireless communication device to assess that at least one of the one or more NB channels is not clear.
18. The wireless communication device of one or more of clauses 1, 7, 8, 10, or 17, where:
the processing system is configured to:
  assess that the first NB channel is not clear, where the first amount of time is to occur after the assessment that the first NB channel is not clear.
19. The wireless communication device of one or more of clauses 1, 7, 8, 10, 17, or 18, where:
each of the one or more CCAs occurs at least a threshold offset after assessing that the first NB channel is not clear.
20. The wireless communication device of one or more of clauses 1, 7, 8, 10, or 17, where:
the interface is configured to:
  move from the first frequency segment to a second frequency segment of the frequency spectrum after identifying that the at least y number of CCAs causes the wireless communication device to assess that at least one of the one or more NB channels is not clear.
21. The wireless communication device of one or more of clauses 1, 7, 8, 10, 17, or 20, where:
the interface is configured to:
  perform FH among a second plurality of NB channels in the second frequency segment during the second amount of time.
22. The wireless communication device of one or more of clauses 1, 7, 8, 10, or 17, where:
each of the one or more CCAs is associated with a timer; and
identifying whether the at least y number of CCAs causes the wireless communication device to assess that at least one of the one or more NB channels is not clear includes identifying whether each of at least y timers associated with the at least y number of CCAs is not expired.
23. The wireless communication device of one or more of clauses 1, 7, 8, 10, or 17, where one or more of:
y equals 2;
the first amount of time is 20 milliseconds (ms);
the second amount of time is 2 seconds (s);
each NB channel is a 1 Megahertz (MHz) channel; or
the first frequency segment is equal to or greater than 20 MHz.
24. The wireless communication device of clause 1, where:
a time between assessing whether the first NB channel is clear and transmitting on the first NB channel is greater than 16 microseconds ($\mu$s) and less than or equal to 200 $\mu$s.
25. A method performed by an apparatus of a wireless communication device for narrowband (NB) communications, including:
associating with a first NB channel;
performing a clear channel assessment (CCA) to assess whether the first NB channel is clear; and
transmitting on the first NB channel when the first NB channel is clear.
26. The method of clause 25, where:
NB communications include Bluetooth® (BT) communications; and
the first NB channel is a first BT channel.
27. The method of one or more of clauses 25 or 26, where:
a first frequency spectrum includes the first BT channel, the first frequency spectrum being used for wideband (WB) communications.
28. The method of one or more of clauses 25-27, where:
WB communications include wireless local area network (WLAN) communications.
29. The method of clause 25, further including:
preventing transmission on the first NB channel after performing the CCA when the first NB channel is not clear during the CCA.
30. The method of clause 25, where:
performing the CCA to assess whether the first NB channel is clear includes:
listening to the first NB channel for a first interference; and comparing the first interference to an interference threshold.

31. The method of clause 25, where:

access to an NB channel of one or more NB channels for transmission is during defined time frames, the one or more NB channels including the first NB channel;

transmission by the wireless communication device on the first NB channel is to occur during a first time frame of the defined time frames; and the CCA to assess whether the first NB channel is clear occurs at a beginning of the first time frame.

32. The method of one or more of clauses 25 or 31, further including:

hopping to a second NB channel from the first NB channel, the one or more NB channels including the second NB channel;

performing the CCA at a beginning of a second time frame of the defined time frames to assess whether the second NB channel is clear; and transmitting on the second NB channel during the second time frame when the second NB channel is clear.

33. The method of one or more of clauses 25, 31, or 32, further including:

preventing transmission on the second NB channel during the second time frame when the second NB channel is not clear.

34. The method of one or more of clauses 25, 31, or 32, further including:

performing frequency hopping (FH) among a plurality of NB channels of a frequency spectrum at the defined time frames, the plurality of NB channels including the one or more NB channels;

transmitting on at least one of the plurality of NB channels; and performing the CCA before each transmission.

35. The method of one or more of clauses 25, 31, 32, or 34, further including:

performing one or more CCAs during a first amount of time;

identifying whether at least x number of NB channels of the one or more NB channels is not clear during the first amount of time using the one or more CCAs, the one or more NB channels in a first frequency segment of the frequency spectrum; and preventing a transmission on the first frequency segment for a second amount of time after identifying that the at least x number of NB channels is not clear.

36. The method of one or more of clauses 25, 31, 32, 34, or 35, further including:

assessing that the first NB channel is not clear, where the first amount of time is to occur after the assessment that the first NB channel is not clear.

37. The method of one or more of clauses 25, 31, 32, or 34-36, where:

each of the one or more CCAs occurs at least a threshold offset after assessing that the first NB channel is not clear.

38. The method of one or more of clauses 25, 31, 32, 34, or 35, further including:

moving from the first frequency segment to a second frequency segment of the frequency spectrum after identifying that the at least x number of NB channels is not clear.

39. The method of one or more of clauses 25, 31, 32, or 34, 35, or 38, further including:

performing FH among a second plurality of NB channels in the second frequency segment during the second amount of time.

40. The method of one or more of clauses 25, 31, 32, 34, or 35, where one or more of:

x equals 2;

the first amount of time is 20 milliseconds (ms);

the second amount of time is 2 seconds (s);

each NB channel is a 1 Megahertz (MHz) channel; or the first frequency segment is equal to or greater than 20 MHz.

41. The method of one or more of clauses 25, 31, 32, or 34, further including:

performing one or more CCAs during a first amount of time to assess whether the one or more NB channels are not clear, the one or more NB channels in a first frequency segment of the frequency spectrum;

identifying whether at least y number of CCAs of the one or more CCAs causes the wireless communication device to assess that at least one of the one or more NB channels is not clear; and preventing a transmission on the first frequency segment for a second amount of time after identifying that the at least y number of CCAs causes the wireless communication device to assess that at least one of the one or more NB channels is not clear.

42. The method of one or more of clauses 25, 31, 32, 34, or 41, further including:

assessing that the first NB channel is not clear, where the first amount of time is to occur after the assessment that the first NB channel is not clear.

43. The method of one or more of clauses 25, 31, 32, 34, 41, or 42, where:

each of the one or more CCAs occurs at least a threshold offset after assessing that the first NB channel is not clear.

44. The method of one or more of clauses 25, 31, 32, 34, or 41, further including:

moving from the first frequency segment to a second frequency segment of the frequency spectrum after identifying that the at least y number of CCAs causes the wireless communication device to assess that at least one of the one or more NB channels is not clear.

45. The method of one or more of clauses 25, 31, 32, 34, 41, or 44, further including:

performing FH among a second plurality of NB channels in the second frequency segment during the second amount of time.

46. The method of one or more of clauses 25, 31, 32, 34, or 41, where:

each of the one or more CCAs is associated with a timer; and identifying whether the at least y number of CCAs causes the wireless communication device to assess that at least one of the one or more NB channels is not clear includes identifying whether each of at least y timers associated with the at least y number of CCAs is not expired.

47. The method of one or more of clauses 25, 31, 32, 34, or 41, where one or more of:

y equals 2;

the first amount of time is 20 milliseconds (ms);

the second amount of time is 2 seconds (s);

each NB channel is a 1 Megahertz (MHz) channel; or the first frequency segment is equal to or greater than 20 MHz.

48. The method of clause 25, where:
a time between assessing whether the first NB channel is clear and transmitting on the first NB channel is greater than 16 microseconds (µs) and less than or equal to 200 µs.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described herein as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products.

What is claimed is:

1. A wireless communication device for narrowband (NB) communications, comprising:
a processing system configured to:
perform a plurality of clear channel assessments (CCAs) to assess whether a plurality of NB channels are not clear, each of the plurality of CCAs being associated with a respective timer; and
identify whether at least a first quantity of CCAs of the plurality of CCAs causes the wireless communication device to assess that at least one of the plurality of NB channels is not clear based at least in part on whether each of at least a second quantity of timers associated with the at least the first quantity of CCAs is not expired, wherein the first quantity is the same as the second quantity; and
an interface configured to:
associate with a first NB channel of the plurality of NB channels; and
transmit on the first NB channel when the first NB channel is clear, wherein:
NB communications include Bluetooth® (BT) communications;
the first NB channel is a first BT channel; and
a first frequency spectrum includes the first BT channel, the first frequency spectrum being used for wireless local area network (WLAN) communications.

2. The wireless communication device of claim 1, wherein:
access to an NB channel of the plurality of NB channels for transmission is during defined time frames;
the transmission by the wireless communication device on the first NB channel is to occur during a first time frame of the defined time frames; and
a first CCA of the plurality of CCAs to assess whether the first NB channel is clear occurs at a beginning of the first time frame.

3. The wireless communication device of claim 2, wherein:
the interface is configured to:
hop to a second NB channel from the first NB channel, the plurality of NB channels including the second NB channel; and
transmit on the second NB channel during a second time frame of the defined time frames when the second NB channel is clear; and
the processing system is configured to:
perform a CCA at a beginning of the second time frame to assess whether the second NB channel is clear.

4. The wireless communication device of claim 3, wherein:
the interface is configured to:
perform frequency hopping (FH) among the plurality of NB channels of the first frequency spectrum at the defined time frames; and
transmit on at least one of the plurality of NB channels; and
the processing system is configured to:
perform the plurality of CCAs before each transmission.

5. The wireless communication device of claim 4, wherein:
the processing system is configured to:
perform the plurality of CCAs during a first amount of time; and
identify whether at least x number of NB channels of the plurality of NB channels is not clear during the first amount of time using the plurality of CCAs, the plurality of NB channels in a first frequency segment of the first frequency spectrum; and the interface is configured to:
prevent a transmission on the first frequency segment for a second amount of time after identifying that the at least x number of NB channels is not clear.

6. The wireless communication device of claim 5, wherein:
the interface is configured to:
move from the first frequency segment to a second frequency segment of the first frequency spectrum after identifying that the at least x number of NB channels is not clear.

7. The wireless communication device of claim 6, wherein:
the interface is configured to:
perform FH among a second plurality of NB channels in the second frequency segment during the second amount of time.

8. The wireless communication device of claim 5, wherein one or more of:
x equals 2;
the first amount of time is 20 milliseconds (ms);
the second amount of time is 2 seconds (s);
each NB channel is a 1 Megahertz (MHz) channel; or
the first frequency segment is equal to or greater than 20 MHz.

9. The wireless communication device of claim 4, wherein:
the processing system is configured to:
perform the plurality of CCAs during a first amount of time, the plurality of NB channels in a first frequency segment of the first frequency spectrum; and
the interface is configured to:
prevent a transmission on the first frequency segment for a second amount of time after identifying that the at least the first quantity of CCAs causes the wireless communication device to assess that at least one of the plurality of NB channels is not clear.

10. The wireless communication device of claim 9, wherein:
the interface is configured to:
move from the first frequency segment to a second frequency segment of the first frequency spectrum after identifying that the at least the first quantity of CCAs causes the wireless communication device to assess that at least one of the plurality of NB channels is not clear.

11. The wireless communication device of claim 10, wherein:
the interface is configured to:
perform FH among a second plurality of NB channels in the second frequency segment during the second amount of time.

12. The wireless communication device of claim 9, wherein one or more of:
the first quantity equals 2;
the first amount of time is 20 milliseconds (ms);
the second amount of time is 2 seconds (s);
each NB channel is a 1 Megahertz (MHz) channel; or
the first frequency segment is equal to or greater than 20 MHz.

13. A method performed by an apparatus of a wireless communication device for narrowband (NB) communications, comprising:

associating with a first NB channel of a plurality of NB channels;
performing a plurality of clear channel assessments (CCAs) to assess whether a plurality of NB channels are not clear, each of the plurality of CCAs being associated with a respective timer;
identifying whether at least a first quantity of CCAs of the plurality of CCAs causes the wireless communication device to assess that at least one of the plurality of NB channels is not clear based at least in part on whether each of at least a second quantity of timers associated with the at least the first quantity of CCAs is not expired, wherein the first quantity is the same as the second quantity; and
transmitting on the first NB channel when the first NB channel is clear,
wherein:
NB communications include Bluetooth® (BT) communications;
the first NB channel is a first BT channel; and
a first frequency spectrum includes the first BT channel, the first frequency spectrum being used for wireless local area network (WLAN) communications.

14. The method of claim 13, wherein:
access to an NB channel of the plurality of NB channels for transmission is during defined time frames;
the transmission by the wireless communication device on the first NB channel is to occur during a first time frame of the defined time frames; and
a first CCA of the plurality of CCAs to assess whether the first NB channel is clear occurs at a beginning of the first time frame.

15. The method of claim 14, further comprising:
hopping to a second NB channel from the first NB channel, the plurality of NB channels including the second NB channel;
performing a CCA at a beginning of a second time frame of the defined time frames to assess whether the second NB channel is clear; and
transmitting on the second NB channel during the second time frame when the second NB channel is clear.

16. The method of claim 15, further comprising:
frequency hopping (FH) among the plurality of NB channels of the first frequency spectrum at the defined time frames;
transmitting on at least one of the plurality of NB channels; and
performing the plurality of CCAs before each transmission.

17. The method of claim 16, further comprising:
performing the plurality of CCAs during a first amount of time;
identifying whether at least x number of NB channels of the plurality of NB channels is not clear during the first amount of time using the plurality of CCAs, the plurality of NB channels in a first frequency segment of the first frequency spectrum; and
preventing a transmission on the first frequency segment for a second amount of time after identifying that the at least x number of NB channels is not clear.

18. The method of claim 17, further comprising:
moving from the first frequency segment to a second frequency segment of the first frequency spectrum after identifying that the at least x number of NB channels is not clear.

19. The method of claim 18, further comprising:
performing FH among a second plurality of NB channels in the second frequency segment during the second amount of time.

20. The method of claim 17, wherein one or more of:
x equals 2;
the first amount of time is 20 milliseconds (ms);
the second amount of time is 2 seconds (s);
each NB channel is a 1 Megahertz (MHz) channel; or
the first frequency segment is equal to or greater than 20 MHz.

21. The method of claim 16, further comprising:
performing the plurality of CCAs during a first amount of time, the plurality of NB channels in a first frequency segment of the first frequency spectrum; and
preventing a transmission on the first frequency segment for a second amount of time after identifying that the at least the first quantity of CCAs causes the wireless communication device to assess that at least one of the plurality of NB channels is not clear.

22. The method of claim 21, further comprising:
moving from the first frequency segment to a second frequency segment of the first frequency spectrum after identifying that the at least the first quantity of CCAs causes the wireless communication device to assess that at least one of the plurality of NB channels is not clear.

23. The method of claim 22, further comprising:
performing FH among a second plurality of NB channels in the second frequency segment during the second amount of time.

24. The method of claim 21, wherein one or more of:
the first quantity equals 2;
the first amount of time is 20 milliseconds (ms);
the second amount of time is 2 seconds (s);
each NB channel is a 1 Megahertz (MHz) channel; or
the first frequency segment is equal to or greater than 20 MHz.

* * * * *